United States Patent
Takaoka et al.

(12)

(10) Patent No.: US 6,589,383 B1
(45) Date of Patent: Jul. 8, 2003

(54) IONICALLY CONDUCTIVE COMPOSITION AND A CELL MANUFACTURED BY USING THE SAME

(75) Inventors: Kazuchiyo Takaoka, Tokyo (JP); Koshiro Ikegami, Tokyo (JP); Kenji Hyodo, Tokyo (JP); Hiroaki Watanabe, Tokyo (JP); Takakazu Hino, Kanagawa (JP); Naoki Shikano, Kanagawa (JP); Eiji Andou, Kanagawa (JP)

(73) Assignees: Mitsubishi Paper Mills Limited, Tokyo (JP); Nippon Unicar Company Limited, Tokyo (JP)

( * ) Notice: Subject to any disclaimer, the term of this patent is extended or adjusted under 35 U.S.C. 154(b) by 0 days.

(21) Appl. No.: 09/600,640

(22) PCT Filed: Oct. 15, 1999

(86) PCT No.: PCT/JP99/05707
§ 371 (c)(1),
(2), (4) Date: Jul. 20, 2000

(87) PCT Pub. No.: WO00/31186
PCT Pub. Date: Jun. 2, 2000

(30) Foreign Application Priority Data

Nov. 20, 1998 (JP) .......................................... 10-331521
Sep. 28, 1999 (WO) ............................... PCT/JP99/05271

(51) Int. Cl.[7] .................................................. C09J 7/00
(52) U.S. Cl. ...................... 156/313; 524/401; 429/188; 252/62.2
(58) Field of Search ...................... 524/401; 429/188; 252/62.2; 156/313

(56) References Cited

U.S. PATENT DOCUMENTS

| 4,855,077 A | * | 8/1989 | Shikinami et al. ........... 524/401 |
| 4,877,854 A | | 10/1989 | Hattori et al. |
| 4,990,360 A | * | 2/1991 | Gornowicz et al. ......... 524/401 |
| 5,112,512 A | * | 5/1992 | Nakamura ................. 252/62.2 |
| 5,138,009 A | | 8/1992 | Inoue |
| 5,202,009 A | * | 4/1993 | Andrieu et al. ............. 252/62.2 |
| 5,236,986 A | | 8/1993 | Sakuta |
| 5,755,985 A | * | 5/1998 | Vallee et al. ................ 252/62.2 |
| 5,912,093 A | * | 6/1999 | Wen et al. ................... 524/401 |

FOREIGN PATENT DOCUMENTS

| JP | A50157898 | 12/1975 |
| JP | A312447 | 1/1991 |
| JP | 4-293955 | 10/1992 |
| JP | A6267329 | 9/1994 |
| JP | A7233243 | 9/1995 |
| JP | A7282619 | 10/1995 |
| JP | A10188666 | 7/1998 |
| WO | A9106585 | 5/1991 |

* cited by examiner

*Primary Examiner*—Michael W. Ball
*Assistant Examiner*—Jessica Rossi
(74) *Attorney, Agent, or Firm*—Birch, Stewart, Kolasch & Birch, LLP

(57) ABSTRACT

The present invention provides an tonically conductive composition comprising a linear copolymer of a compound (A) having two functional groups (a) and a compound (B) having two functional groups (b) and an electrolyte; as well as a battery containing it. Preferably, a polymer having a network structure obtained by reacting the linear copolymer having functional group (b) at each end with a compound having three or more functional groups (a) is used in the ionically conductive composition of the present invention.

32 Claims, No Drawings

IONICALLY CONDUCTIVE COMPOSITION AND A CELL MANUFACTURED BY USING THE SAME

This application is the national phase under 35 U.S.C. § 371 of PCT International Application No. PCT/JP99/05707 which has an International filing date of Oct. 15, 1999, which designated the United States of America.

FIELD OF THE INVENTION

The present invention relates to ionically conductive compositions containing a polymer and batteries using them. More specifically, the present invention relates to tonically conductive compositions containing a block polymer and batteries using them.

BACKGROUND OF THE INVENTION

Ionically conductive materials are used in various batteries and devices such as primary batteries, secondary batteries, solar cells, electrolytic condensers, sensors, electrochromic display devices, etc. In the field of the recent electronics industry, higher performance of various electronic components is constantly sought and their miniaturization and lamellation increasingly advance, so that proportional improvements are also desired in ionically conductive materials themselves used in batteries or devices. Ionically conductive materials conventionally used in the form of liquid or fluid have problems such as damage of peripheral parts due to leakage.

In order to address these problems, solid electrolyte materials such as polymer electrolytes or gel electrolytes have recently been proposed. These have excellent properties such as relatively high ionic conductivity, wide potential window, good film-forming properties, flexibility, light weight, elasticity, transparency, etc. Among these, flexibility, elasticity and the like which are unique to polymer electrolytes are especially important for lithium secondary batteries because many electrode active materials in the batteries change their volumes during operation and the properties of the polymer electrolytes serve to absorb such volume change. Moreover, polymer electrolytes and gel electrolytes are said to have the ability to prevent the loss of battery capacity or short of electrodes due to the defection of electrode materials during repeated use.

JP No. 61-23944/86B discloses a polyamide resin having one-dimensional structure as an organic polymer compound for use in such polymer electrolytes, but does not specifically disclose any polyamide resins.

Advanced Materials, 10, 439 (1998) Discloses polyoxyethylenes; polyoxyethylene-polysiloxane complexes; polyoxyethylene-polyphosphazene complexes; crosslinked polymers having a polyoxyethylene in the structural unit and also having an epoxy or isocyanate group and a siloxane structure as a polymer electrolyte. Particularly, the crosslinked polymers having a polyoxyalkylene group and a polysiloxane structure are noticeable polymer electrolytes in terms of their excellent low-temperature characteristics.

As a polymer for such a polymer electrolyte having a polyoxyalkylene group and a polysiloxane structural unit, J. Polym. Sci. Polym. Lett. Ed., 22, 659 (1984) discloses:

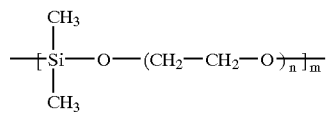

Solid State Ionics, 15, 233 (1985) discloses:

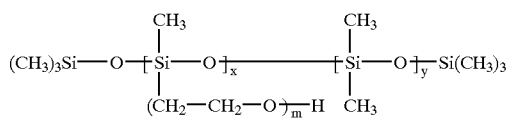

JP No. 63-136409/88A discloses:

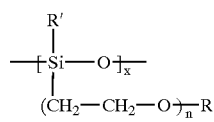

and JP No. 8-78053/96A discloses a silicone compound represented by the formula:

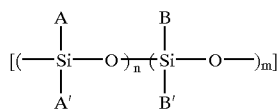

wherein A and A' represents an alkyl group, and B and/or B' represents an oxyalkylene chain. All these polymers have a polyoxyalkylene chain only in the side chain of the polysiloxane backbone.

JP No. 8-21389/96B discloses a crosslinked cured polysiloxane having an organic group containing an oxyalkylene group or a polyoxyalkylene group as a side chain and/or as a crosslinking moiety, and JP No. 6-35545/94B discloses a crosslinked cured polysiloxane represented by the formula:

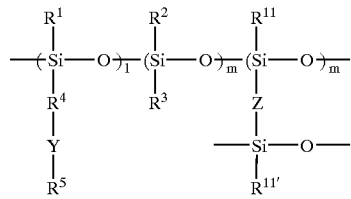

wherein $R^1$, $R^2$, $R^3$, $R^{11}$ and $R^{11'}$ represent an alkyl, alkoxyl or aryl group, $R^4$ represents an alkylene, oxyalkylene or oxycarbonylalkylene group, $R^5$ represents a hydrogen atom or an alkyl group, Y represents an oxyalkylene or polyoxyalkylne group, and Z represents a group having an oxyalkylene or polyoxyalkylene group or a polysiloxane structure at each end.

However, none of these have been practically applied to a polymer electrolyte because of problems of the stability of polymers themselves, unavailability of crosslinked structures capable of preventing the defection of electrode materials and allowing lamellation, insufficient ionic conductivity, etc.

SUMMARY OF THE INVENTION

An object of the present invention is to provide an tonically conductive composition suitable for use in batteries and a battery containing it.

According to the first aspect of the present invention, an ionically conductive composition is provided, comprising:

a linear copolymer obtained by polymerizing compound (A) having two functional groups (a) and compound (B) having two functional groups (b) via the formation of a bond between said functional groups (a) and (b); and an electrolyte.

The reaction for forming such a bond may be an addition reaction to an unsaturated group, a ring-opening reaction of an epoxy group, an addition reaction to an isocyanate or isothiocyanate, a condensation reaction or a reaction using an alkyl halide, preferably an addition reaction to an unsaturated group, a ring-opening reaction of an epoxy group, or an addition reaction to an isocyanate or isothiocyanate, more preferably an addition reaction of a hydrosilyl group to an unsaturated group.

When an addition reaction to an unsaturated group is used, examples of compound (A) include compounds represented by the formula:

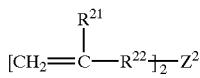

(A-1)

wherein $R^{21}$ independently represents a hydrogen atom, a substituted or unsubstituted alkyl group containing 1 to 18 carbon atoms, or a substituted or unsubstituted aryl group containing 6 to 20 carbon atoms, $R^{22}$ represents an alkylene group containing 1 to 18 carbon atoms, a substituted or unsubstituted arylene group containing 6 to 20 carbon atoms, an arylalkylene group containing 7 to 21 carbon atoms, or a direct bond, and $Z^2$ represents a divalent group. Examples of compound (B) having hydrosilyl groups suitable for the addition reaction to the above compounds include polysiloxane compounds represented by the formula:

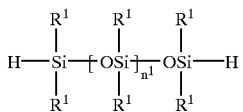

(B-1)

wherein $R^1$ independently represents a substituted or unsubstituted alkyl group containing 1 to 18 carbon atoms, an aralkyl group containing 7 to 21 carbon atoms, or a substituted or unsubstituted aryl group containing 6 to 20 carbon atoms, and $n^1$ represents an integer of 0 to 500, and dimethyl silane.

When a ring-opening reaction of an epoxy group is used, examples of compound (A) include bis-epoxy compounds represented by the formula:

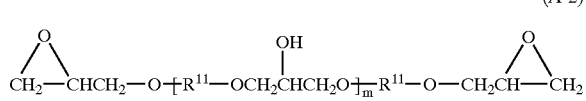

(A-2)

wherein $R^{11}$ represents an aliphatic or aromatic hydrocarbon group containing 1 to 13 carbon atoms, and m represents an integer of 0 to 20; bis-epoxy compounds represented by the formula:

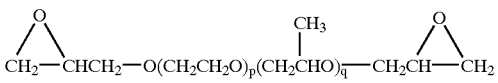

(A-3)

wherein p and q independently represent an integer of 0 to 200; and modified silicones having an epoxy group at each end; and examples of compound (B) include diamines represented by the formula:

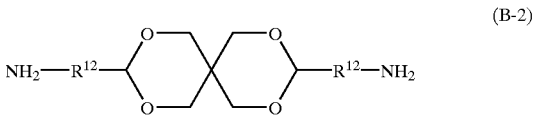

(B-2)

wherein $R^{12}$ represents an alkylene group containing 1 to 6 carbon atoms.

When an addition reaction to an isocyanate is used, examples of compound (A) include diisocyanates represented by the formula:

OCN—$R^{11}$—NCO    (A-4)

wherein $R^{11}$ is as defined above, and examples of compound (B) include diols such as ethylene glycol, propylene glycol, polyethylene glycol, polypropylene glycol, ethylene oxide-propylene oxide copolymers.

According to the second aspect of the present invention, a crosslinked copolymer having linear copolymer (C) as a base unit is provided, which is obtained by reacting linear copolymer (C) having two functional groups (b) with polyfunctional compound (D) having three or more functional groups (a), said linear copolymer (C) being obtained by reacting compound (A) with an excess of compound (B).

In a preferred embodiment, compound (A) is represented by the above formula (A-1), compound (B) is dimethyl silane or represented by the above formula (B-1), and compound (D) is represented by the formula:

(D-1)

wherein $R^{31}$ independently represents a hydrogen atom, a substituted or unsubstituted alkyl group containing 1 to 18 carbon atoms, or a substituted or unsubstituted aryl group containing 6 to 20 carbon atoms, $R^{32}$ represents an alkylene group containing 1 to 18 carbon atoms, an arylalkylene group containing 7 to 21 carbon atoms, a heteroatom-containing alkylene group containing 1 to 12 carbon atoms and 1 to 6 heteroatoms, or a direct bond, $n^{31}$ represents an integer of 3 or more, and $Z^3$ represents a linking group having the same valence as $n^{31}$ selected from a carbon atom, a silicon atom, a monosubstituted trivalent silicon atom, an aliphatic group containing 1 to 30 carbon atoms, a heteroatom-containing organic group containing 1 to 30 carbon atoms and 1 to 6 heteroatoms, a benzenepolycarboxy group, a phosphate group, or a straight, branched or cyclic alkyl siloxane group containing 2 to 50 silicon atoms.

In another preferred embodiment, compound (A) is a diisocyanate represented by the above formula (A-4), compound (B) is a diol, and compound (D) is a polyisocyanate containing 3 or more isocyanate groups.

According to the third aspect of the present invention, a crosslinked copolymer having linear copolymer (C') as a base unit is provided, which is obtained by reacting linear copolymer (C') having two functional groups (a) with polyfunctional compound (E) having three or more functional groups (b), said linear copolymer (C') being obtained by reacting compound (B) with an excess of compound (A).

In a preferred embodiment, compound (A) is represented by the above formula (A-1), compound (B) is dimethyl silane or represented by the above formula (B-1), and compound (E) is a polysiloxane compound having three or more hydrosilyl groups represented by the formula:

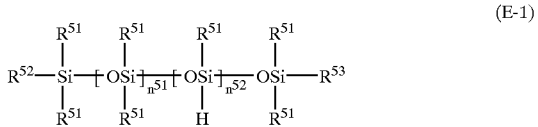

(E-1)

wherein $R^{51}$ independently represents a substituted or unsubstituted alkyl group containing 1 to 18 carbon atoms, an aralkyl group containing 7 to 21 carbon atoms, or a substituted or unsubstituted aryl group containing 6 to 20 carbon atoms, $R^{52}$ and $R^{53}$ independently represent a hydrogen group, a substituted or unsubstituted alkyl group containing 1 to 18 carbon atoms, an aralkyl group is containing 7 to 21 carbon atoms, or a substituted or unsubstituted aryl group containing 6 to 20 carbon atoms, or $R^{52}$ and $R^{53}$ may be combined to form —O—, and $n^{51}$ and $n^{52}$ represent an integer of 0 or 1 or more with $n^{51}+n^{52}$ being 1 to 500, provided that the total number of hydrogen atoms directly bonded to silicon atoms including the hydrogen atoms eventually represented by $R^{52}$ and/or $R^{53}$ is 3 or more.

According to the fourth aspect of the present invention, an ionically conductive composition is provided, comprising:

a crosslinked copolymer obtained by reacting said polyfunctional compound (D-1), said polysiloxane compound (E-1) having three or more hydrosilyl groups and a compound (F) having an unsaturated hydrocarbon group at one end, which compound (F) is represented by the formula:

(F)

wherein $R^{41}$ independently represents a hydrogen atom, a substituted or unsubstituted alkyl group containing 1 to 18 carbon atoms, or a substituted or unsubstituted aryl group containing 6 to 20 carbon atoms, $R^{42}$ represents an alkylene group containing 1 to 18 carbon atoms, a substituted or unsubstituted arylene group containing 6 to 20 carbon atoms, an arylalkylene group containing 7 to 21 carbon atoms, or a direct bond, $R^{43}$ represents a hydrogen atom, a substituted or unsubstituted alkyl group containing 1 to 18 carbon atoms, or a substituted or unsubstituted aryl group containing 6 to 20 carbon atoms, and $A^2$ represents a divalent group; and an electrolyte.

According to the fifth aspect of the present invention, a process for preparing a battery containing said ionically conductive composition and a battery prepared therefrom are provided.

According to the sixth aspect of the present invention, a gel composition comprising said crosslinked copolymer and a solvent is provided.

DETAILED DESCRIPTION OF THE INVENTION

According to the first aspect of the present invention, an ionically conductive composition is provided, comprising:

a linear copolymer obtained by polymerizing compound (A) having two functional groups (a) and compound (B) having two functional groups (b) via the formation of a bond between said functional groups (a) and (b); and an electrolyte.

(The reaction for forming such a bond may be an addition reaction to an unsaturated group, a ring-opening reaction of an epoxy group, an addition reaction to an isocyanate or isothiocyanate, a condensation reaction or a reaction using an alkyl halide, preferably an addition reaction to an unsaturated group, a ring-opening reaction of an epoxy group, or an addition reaction to an isocyanate or isothiocyanate, more preferably an addition reaction of hydrosilyl groups to an unsaturated group.)

For an addition reaction to an unsaturated group, functional group (a) is a double bond and functional group (b) may be, for example, a hydroxyl, amino, thiol or hydrosilyl group.

Examples of compound (A) having such a group include compounds represented by the formula:

(A-1)

wherein $R^{21}$ independently represents a hydrogen atom, a substituted or unsubstituted alkyl group containing 1 to 18 carbon atoms, or a substituted or unsubstituted aryl group containing 6 to 20 carbon atoms, $R^{22}$ represents an alkylene group containing 1 to 18 carbon atoms, a substituted or unsubstituted arylene group containing 6 to 20 carbon atoms, an arylalkylene group containing 7 to 21 carbon atoms, or a direct bond, and $Z^2$ represents a divalent group.

In formula (A-1), the alkyl group represented by $R^{21}$ may be, for example, methyl, ethyl, propyl, butyl, octyl, dodecyl, etc., and the aryl group may be, for example, phenyl, tolyl, naphthyl, etc. For $R^{22}$, the alkylene group may be, for example, methylene, ethylene, propylene, butylene, octylene, dodecylene, etc., the arylene group may be, for example, phenylene, tolylene, naphthylene, etc., and the arylalkylene group may be, for example, phenylmethylene, phenylethylene, phenylethylidene, etc. Preferably, $R^{21}$ is a hydrogen atom or a methyl group, $R^{22}$ is an alkylene group containing 1 to 4 carbon atoms or a direct bond, and $Z^2$ is an alkylene or a divalent chain derived from a (polyoxyalkylene,) a polycarbonate or carbonate, a polyester or ester, a polyacrylate, a polymethacrylate or a polysiloxane. More preferably, $R^{21}$ is a hydrogen atom, $R^{22}$ is an methylene group or a direct bond, and $Z^2$ is a polyoxyalkylene chain or a polycarbonate or carbonate or a polyester or ester chain containing an oxyalkyelene group, most preferably, $Z^2$ is a (Polyoxyalkylene chain.) In these compounds, the linkage between the terminal alkenyl group and $Z^2$ depends on the nature of the chain of $Z^2$. For example, the terminal alkenyl group is bonded via an ether linkage when $Z^2$ is a polyoxyalkylene chain, or the terminal alkenyl group is bonded via an ether linkage or ester linkage when $Z^2$ is a polyester chain.

On the other hand, examples of compound (B) include diols such as ethylene glycol, propylene glycol, polyethylene glycol, polypropylene glycol, ethylene oxide-propylene oxide copolymers, bisphenol A, modified silicones having an alcoholic hydroxyl group at each end and modified silicones having a polyether at each end; diamines such as ethylene diamine, phenylene diamine, 4,4- diaminodiphenylmethane, benzidine, $H_2NC_2H_4O(CH_2CH_2O)_p$ $(CH_2CH(CH_3)O)_q C_2H_4NH_2$, $H_2NC_3H_6O(CH_2CH_2O)_p$ $(CH_2CH(CH_3)O)_q C_3H_6NH_2$ wherein p and q independently represent an integer of 0 to 200 and modified silicones having an amino group at each end; as well as polysiloxane compounds having hydrosilyl groups represented by the formula:

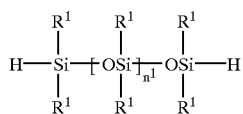

(B-1)

wherein $R^1$ independently represents a substituted or unsubstituted alkyl group containing 1 to 18 carbon atoms, an aralkyl group containing 7 to 21 carbon atoms, or a substituted or unsubstituted aryl group containing 6 to 20 carbon atoms, and $n^1$ represents an integer of 0 to 500; and dimethyl silane.

In formula (B-1), the alkyl group represented by $R^1$ may be, for example, methyl, ethyl, propyl, butyl, octyl, dodecyl, etc., the aralkyl group may be, for example, benzyl, phenethyl, etc., and the aryl group may be, for example, phenyl, tolyl, naphthyl, etc. The substituted alkyl group represented by $R^1$ may be, for example, an alkyl halide group such as trifluoropropyl or chloropropyl or a cyanoalkyl group such as 2-cyanoethyl. Preferably, $R^1$ is a methyl group, and $n^1$ is an integer of 1 to 50.

For a ring-opening reaction of an epoxy group, functional group (a) is an epoxy group, and functional group (b) may be, for example, carboxyl or amino group.

Examples of compound (A) having such a group include bis-epoxy compounds represented by the formula:

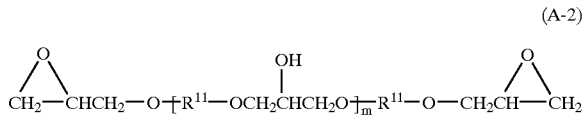

(A-2)

wherein $R^{11}$ represents an aliphatic or aromatic hydrocarbon group containing 1 to 20 carbon atoms, and m represents an integer of 0 to 20; bis-epoxy compounds represented by the formula:

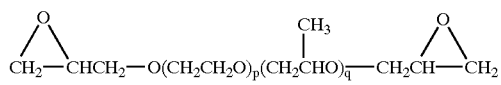

(A-3)

wherein p and q independently represent an integer of 0 to 200; and modified silicones having an epoxy group at each end.

Examples of compound (B) include dicarboxylic acids such as adipic acid, phthalic acid, fumaric acid, oxalic acid, maleic acid and modified-silicones having a carboxylate group at each end and anhydrides thereof, as well as diamines listed above in the explanation of the addition reaction of hydrosilyl groups to an unsaturated group. Preferably, compound (A) is a bis-epoxy compound represented by any one of the above formulae and compound (B) is a diamine represented by the formula:

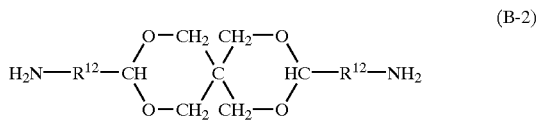

(B-2)

wherein $R^{12}$ represents an-alkylene group containing 1 to 6 carbon atoms. Such ring-opening reaction can be carried out by any methods well known to those skilled in the art.

For an addition reaction to an isocyanate or isothiocyanate group, functional group (a) is an isocyanate or isothiocyanate group, and functional group (b) may be, for example, hydroxyl, amino or carboxyl group.

Examples of compound (A) having such a group include diisocyanates represented by the formula:

OCN—$R^{11}$—NCO (A-4)

wherein $R^{11}$ is as defined above; and diisothiocyanates corresponding thereto. Specific examples include phenylene diisocyanate, phenylene diisothiocyanate, methylene bis(phenylisocyanate), methylene bis(phenylisothiocyanate), tolylene diisocyanate and modified silicones having an isocyanate or isothiocyanate at each end.

Examples of compound (B) include diols and diamines listed above in the explanation of the addition reaction of hydrosilyl groups to an unsaturated group, as well as dicarboxilic acids listed above in the explanation of the ring-opening reaction of an epoxy group.

Preferably, compound (A) is phenylene diisocyanate, phenylene diisothiocyanate, methylene bis(phenylisocyanate), methylene bis(phenylisothiocyanate) or tolylene diisocyanate, and compound (B) is a diol such as polyethylene glycol, polypropylene glycol or ethylene oxide-propylene oxide copolymers having a molecular weight of 500 to 3000. Such addition reaction can be carried out by any methods well known to those skilled in the art.

Condensation reaction may be formation of an amide linkage between a carboxyl group and an amino group, formation of an ester linkage between a carboxyl group and a hydroxyl group, and formation of an imide linkage between an acid anhydride and an amino group. Thus, examples of functional group (a) here include carboxyl group and acid anhydrides, and examples of compound (A) having such a group include dicarboxylic acids listed above in the explanation of the ring-opening reaction of an epoxy group and anhydrides thereof. Examples of functional group (b) include amino and hydroxyl groups. Examples of compound (B) having such a group include diols and diamines listed above in the explanation of the addition reaction of hydrosilyl groups to an unsaturated group. This condensation reaction may also be formation of an ether linkage via the reaction between an alkyl halide and a metal alcoholate. Compounds (A) and (B) here are both derived from diols listed above. Such a condensation reaction can be carried out by any methods well known to those skilled in the art.

In this embodiment, a compound (A) having two functional groups (a) and a compound (B) having two functional groups (b) react with and alternately bind to each other to form a linear copolymer. Particularly when both compounds (B) and (A) are polymers, a linear block copolymer is formed. If compound (B) is added in excess in the reaction of these two compounds, a linear copolymer having two functional groups (b) is formed. For example, 1 mole of compound (A) is reacted with 2 moles of compound (B) to produce 1 mole of a linear copolymer having an average structure of BAB. When 2 moles of compound (A) is reacted with 3 moles of compound (B), 1 mole of a linear copolymer having an average structure of BABAB is produced. When 3 moles of compound (A) is reacted with 4 moles of compound (B), 1 mole of a linear copolymer having an average structure of BABABAB is produced.

In a preferred embodiment, compound (A) is a compound represented by formula (A-1). Specific examples include polyoxyalkylenes having an alkenyl group at each end such as:

(A-1-1)

-continued
(A-1-2)
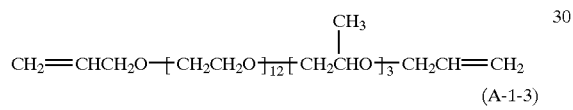

(A-1-3)
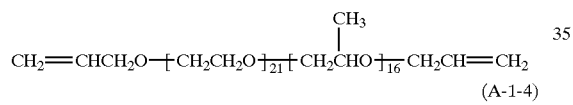

(A-1-4)
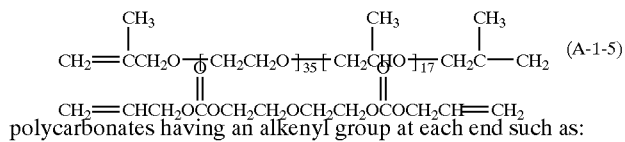
(A-1-5)

polycarbonates having an alkenyl group at each end such as:
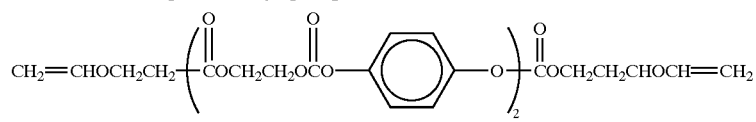

polyesters having an alkenyl group at each end such as:

(A-1-8)
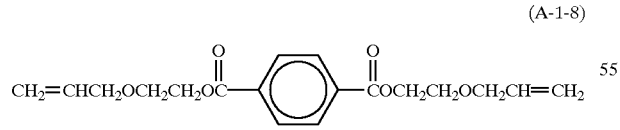

-continued
(A-1-9)
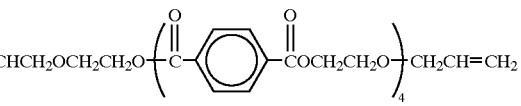

alkylenes having an alkenyl group at each end such as:

$CH_2=CHCH_2CH_2CH_2CH_2CH_2CH=CH_2$ (A-1-10)

polyacrylates having an alkenyl group at each end such as:

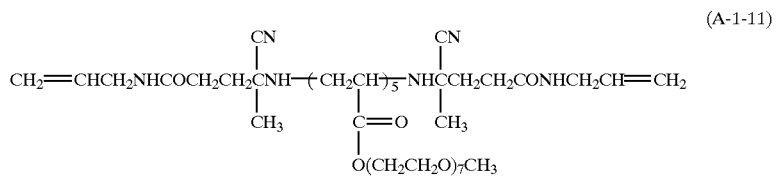
(A-1-11)

and polymethacrylates having an alkenyl group at each end such as:

(A-1-6)
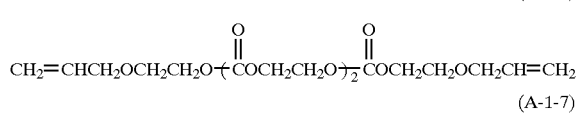
(A-1-7)

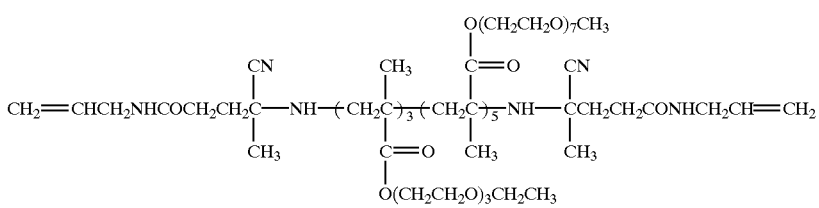

(A-1-12)

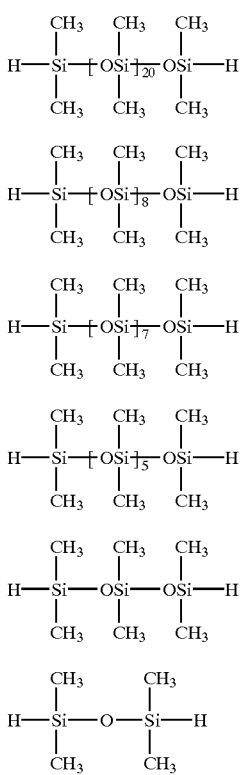

(B-1-1)
(B-1-2)
(B-1-3)
(B-1-4)
(B-1-5)
(B-1-6)

Compound (A-1) and compound (B-1) as specifically shown above react with each other to form a linear polysiloxane block copolymer in which these compounds are alternately arranged.

The addition reaction between compound (A-1) and a polysiloxane compound of compound (B-1) or dimethyl silane which is called hydrosilylation reaction can be promoted by heating the reactants which have been mixed at or below room temperature because of the high temperature dependency of the reaction. This is a great advantage of hydrosilylation reaction, which allows a desired form of polymer to be directly obtained by mixing reactants at an appropriate viscosity, molding the mixture, followed by heating. The heating temperature here is about 50° C. to 150° C., preferably about 60° C. to 120° C. This hydrosilylation reaction involves the use of a catalyst. Known catalysts include compounds of platinum, ruthenium, rhodium, palladium, osmium, iridium, etc. However, platinum compounds are especially useful for batteries because they catalyze a rapid reaction, cause no secondary reaction with the reaction product, have no influence on battery characteristics, etc. Suitable platinum compounds include chloroplatinic acid, elemental platinum, metallic platinum supported on carriers such as alumina, silica, carbon black or the like, platinum-vinylsiloxane complexes, platinum-phosphine complexes, platinum-phosphite complexes, platinum alcoholate catalysts, etc. A platinum catalyst is added to the hydrosilylation reaction in an amount of elemental platinum of about 0.0001% by weight to 0.1% by weight.

The resulting linear copolymer has a molecular weight of 10,000 or more, preferably 50,000 to 10,000,000.

An electrolyte and a solvent required for forming ionically conductive composition may be added before or after the reaction of compounds (A) and (B). Alternatively, only part of them may be added before the reaction and then the remainder may be added. Processes for preparing ionically conductive compositions using these linear copolymers will be described in detail later.

According to the second aspect of the present invention, a crosslinked copolymer having linear copolymer (C) as a base unit is provided, which is obtained by reacting linear copolymer (C) having two functional groups (b) with polyfunctional compound (D) having three or more functional groups (a), said linear copolymer (C) being obtained by reacting compound (A) with an excess of compound (B).

In a preferred embodiment, compound (A) is represented by the above formula (A-1), compound (B) is dimethyl silane or represented by the above formula (B-1), and compound (D) is represented by the formula:

(D-1)

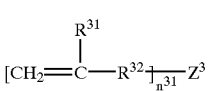

wherein $R^{31}$ independently represents a hydrogen atom, a substituted or unsubstituted alkyl group containing 1 to 18 carbon atoms, or a substituted or unsubstituted aryl group containing 6 to 20 carbon atoms, $R^{32}$ represents an alkylene group containing 1 to 18 carbon atoms, an arylalkylene group containing 7 to 21 carbon atoms, a heteroatom-containing alkylene group containing 1 to 12 carbon atoms and 1 to 6 heteroatoms, or a direct bond, $n^{31}$ represents an integer of 3 or more, and $Z^3$ represents a linking group having the same valence as $n^{31}$ selected from a carbon atom, a silicon atom, a monosubstituted trivalent silicon atom, an aliphatic group containing 1 to 30 carbon atoms, a heteroatom-containing organic group containing 1 to 30 carbon atoms and 1 to 6 heteroatoms, a benzenepolycarboxy group, a phosphate group, or a straight, branched or cyclic alkyl siloxane group containing 2 to 50 silicon atoms.

In formula (D-1), the alkyl group represented by $R^{31}$ may be, for example, methyl, ethyl, propyl, butyl, octyl, dodecyl, etc., and the aryl group may be, for example, phenyl, tolyl, naphthyl, etc. For $R^{32}$, the alkylene group may be, for example, methylene, ethylene, propylene, butylene, octylene, dodecylene, etc., and the arylalkylene group may be, for example, phenylmethylene, phenylethylene, phenylethylidene, etc. The term "heteroatom-containing alkylene group" used for $R^{32}$ means a group which contains an oxygen, sulfur or nitrogen atom as a heteroatom and which can be taken to be an alkylene group as a whole by counting these heteroatoms as carbon atoms. Such groups include methyleneoxymethylene, methyleneoxyethylene, methyleneoxypropylene, ethyleneoxypropylene, methyleneoxyethyleneoxymethylene, ethyleneoxyethyleneoxyethylene, propyleneoxyethyleneoxypropylene, those groups wherein oxygen atoms are replaced with sulfur or nitrogen atoms, and those groups wherein oxygen atoms are partially replaced with sulfur and/or nitrogen atoms. The aliphatic group represented by $Z^3$ may be trivalent or higher straight or branched alkyl groups such as methynyl, ethynyl, propynyl, butynyl, octynyl or dodecynyl. The term "heteroatom-containing organic group" used for $Z^3$ means an aliphatic or aromatic group containing an oxygen, sulfur or nitrogen atom as a heteroatom. Such groups include methyleneoxymethynyl, methyleneoxyethynyl, methyleneoxypropynyl, ethyleneoxypropynyl, methyleneoxyethyleneoxymethynyl, ethyleneoxyethyleneoxyethynyl, propyleneoxyethyleneoxypropynyl, phenylenebis(methyloxyethynyl), those groups wherein oxygen atoms are replaced with sulfur or nitrogen atoms, and those groups wherein oxygen atoms are partially replaced with sulfur and/or nitrogen atoms. The monosubstituted trivalent silicon atom for $Z^3$ may be, for example, ≡Si-alkyl, such as ≡Si—CH₃.

Preferably, $R^{31}$ is a hydrogen atom or methyl, $R^{32}$ is —CH₂OCH₂—, —CH₂OCH₂CH₂— or —CH₂OCH₂CH₂OCH₂—.

Specific examples of compound (D-1) include the following compounds:

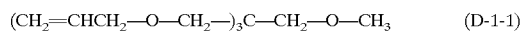
(D-1-1)

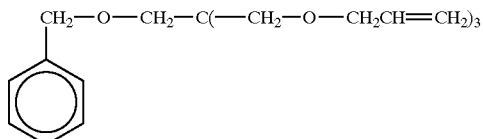
(D-1-2)

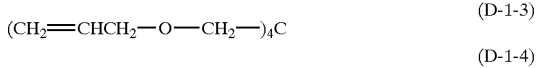
(D-1-3)

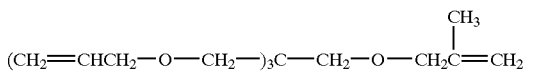
(D-1-4)

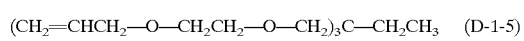
(D-1-5)

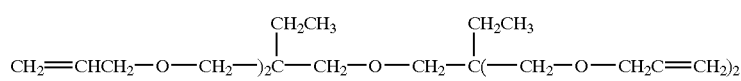
(D-1-6)

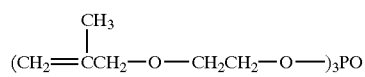
(D-1-7)

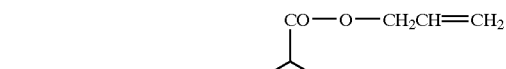
(D-1-8)

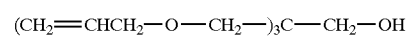
(D-1-9)

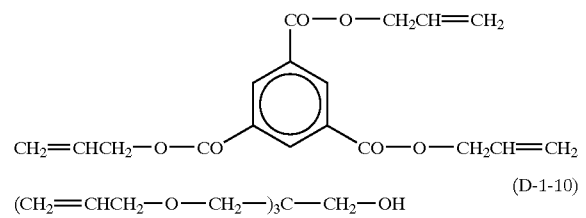
(D-1-10)

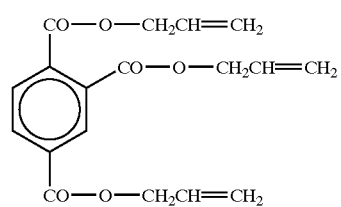

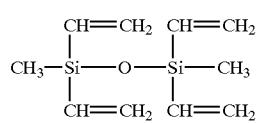
(D-1-11)

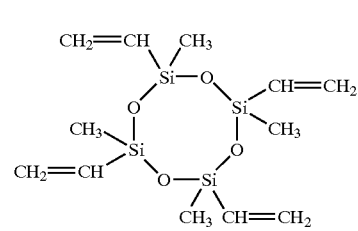
(D-1-12)

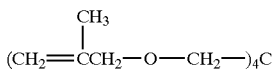

(D-1-13)

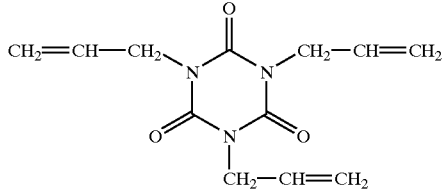

(D-1-14)

In another preferred embodiment, compound (A) is a diisocyanate represented by the formula:

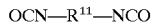 (A-4)

wherein $R^{11}$ is as defined above; compound (B) is a polyethylene glycol, polypropylene glycol or ethylene oxide-propylene oxide copolymer having a molecular weight of 500 to 5000, and compound (D) is a polyisocyanate having three or more isocyanate groups, such as triphenylmethane triisocyanate or a triisocyanate represented by the formula:

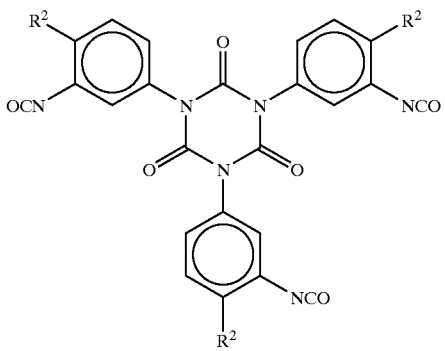

(D-2)

wherein $R^2$ represents an alkyl group containing 1 to 6 carbon atoms.

These reactions can also be carried out by simultaneously reacting the three compounds.

This polymer has a linear copolymer (C) as a base unit and forms a network structure via the moieties of a compound having three or more functional groups (a), and when an electrolyte is included, it forms a crosslinked polymer electrolyte. When a solvent is further included, it forms a gel electrolyte. In case of gels, linear copolymer (C) should preferably have a molecular weight of 1000 or more because crosslink density increases to give hard polymers at too low molecular weights. More preferably, the molecular weight is 3000 or more. However, the molecular weight of linear copolymer (C) here is preferably 20,000 or less because, at too high molecular weights, viscosity increases to present difficulties in handling. In case of solid electrolytes, the molecular weight of linear copolymer (C) is preferably 500 to 100,000, more preferably 1,000 to 50,000, and most preferably 5,000 to 20,000.

The crosslink density of crosslinked copolymers of the present invention partially depends on the molecular weight of linear copolymer (C), but copolymers having a preferred crosslink density are obtained when linear copolymer (C) and polyfunctional compound (D) satisfy the equation:

$0.5 \leq [(\text{number of moles of } D \times \text{valence of } D)/(\text{number of moles of } C \times 2)] \leq 1.5$ (I)

and particularly when equation (I) has a lower limit of 0.8 and an upper limit of 1.2. If crosslinked copolymers of the present invention are to be obtained by simultaneously reacting compounds (A), (B) and (D) without mediation of linear copolymer (C), copolymers having a preferred crosslink density are obtained when these compounds simultaneously satisfy the equations:

$0.4 \leq [\text{number of moles of } A/\text{number of moles of } B] \leq 1.2$ (II)

$0.05 \leq [(\text{number of moles of } D \times \text{valence of } D)/(\text{number of moles of } B \times 2)] \leq 1.0$ (III)

and particularly when equation (II) has a lower limit of 0.6 and an upper limit of 1.0 and equation (III) has a lower limit of 0.1 and an upper limit of 0.6.

In a preferred embodiment, linear copolymer (C) is formed from compound (A-1) and compound (B-1) or dimethyl silane. In this case, two or more species of each of compounds (A-1), (B-1) and polyfunctional compounds (D-1) may be used. In the reaction of linear copolymer (C) with polyfunctional compound (D-1), compound (A-1) and/or (B-1) or dimethyl silane may be further added.

An electrolyte and a solvent required for forming ionically conductive composition may be added before or after the reaction of linear copolymer (C) with polyfunctional compound (D). Alternatively, only part of them may be added before the reaction and then the remainder may be added. Processes for preparing ionically conductive compositions comprising the crosslinked copolymer containing linear copolymer (C) as a base unit will be described in detail later.

According to the third aspect of the present invention, a crosslinked copolymer having linear copolymer (C') as a base unit is provided, which is obtained by reacting linear copolymer (C') having two functional groups (a) with polyfunctional compound (E) having three or more functional groups (b), said linear copolymer (C') being obtained by reacting compound (B) with an excess of compound (A).

In a preferred embodiment, compound (A) is represented by the above formula (A-1), compound (B) is dimethyl silane or represented by the above formula (B-1), and compound (E) is represented by the formula:

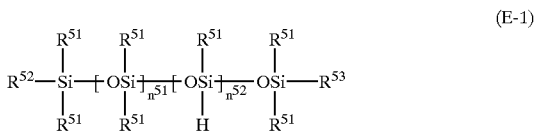

(E-1)

wherein $R^{51}$ independently represents a substituted or unsubstituted alkyl group containing 1 to 18 carbon atoms, an aralkyl group containing 7 to 21 carbon atoms, or a substituted or unsubstituted aryl group containing 6 to 20 carbon atoms, $R^{52}$ and $R^{53}$ independently represent a hydrogen group, a substituted or unsubstituted alkyl group containing 1 to 18 carbon atoms, an aralkyl group containing 7 to 21 carbon atoms, or a substituted or unsubstituted aryl group containing 6 to 20 carbon atoms, or $R^{52}$ and $R^{53}$ may be combined to form —O—, and $n^{51}$ and $n^{52}$ represent an integer of 0 or 1 or more with $n^{51}+n^{52}$ being 1 to 500, provided that the total number of hydrogen atoms directly bonded to -silicon atoms including the hydrogen atoms eventually represented by $R^{52}$ and/or $R^{53}$ is 3 or more.

In formula (E-1), examples of the alkyl, aralkyl and aryl groups represented by $R^{51}$, $R^{52}$ and $R^{53}$ are the same as listed for $R^1$ in compound (B). Preferably, $R^{51}$ is a methyl group, $R^{52}$ and $R^{53}$ are a hydrogen atom or a methyl group, and $n^{51}$ and $n^{52}$ are an integer of 1 to 50.

Specific examples of compound (E-1) are linear polysiloxanes such as:

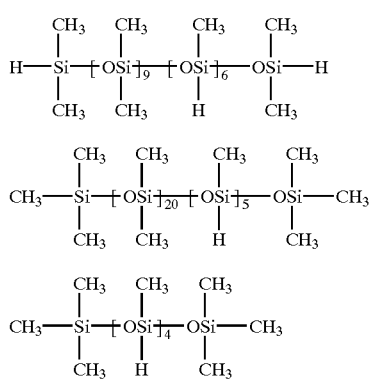

cyclic polysiloxanes such as:

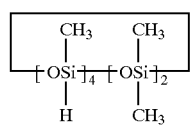

and ladder polysiloxanes wherein two silicon atoms are crosslinked via an oxygen atom such as:

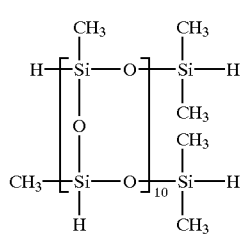

These reactions can also be carried out by simultaneously reacting the three compounds.

This polymer has a linear copolymer (C') as a base unit and forms a network structure via the moieties of a compound having three or more functional groups (a), and when an electrolyte is included, it forms a crosslinked polymer electrolyte. When a solvent is further included, it forms a gel electrolyte. In case of gels, linear copolymer (C') should preferably have a molecular weight of 1000 or more because crosslink density increases to give hard polymers at too low molecular weights. More preferably, the molecular weight is 3000 or more. However, the molecular weight of linear copolymer (C') here is preferably 20,000 or less because, at too high molecular weights, viscosity increases to present difficulties in handling. In case of solid electrolytes, the molecular weight of linear copolymer (C') is preferably 500 to 100,000, more preferably 1,000 to 50,000, and most preferably 5,000 to 20,000.

The crosslink density of the crosslinked copolymers of the present invention partially depends on the molecular weight of linear copolymer (C'), but copolymers having a preferred crosslink density are obtained when linear copolymer (C') and polyfunctional compound (E) satisfy the equation:

$$0.5 \leq [(\text{number of moles of } E \times \text{valence of } E)/(\text{number of moles of } C' \times 2)] \leq 1.5 \quad (\text{I'})$$

and particularly when equation (I') has a lower limit of 0.8 and an upper limit of 1.2. If the crosslinked copolymers of the present invention are to be obtained by simultaneously reacting compounds (A), (B) and (E) without mediation of linear copolymer (C'), copolymers having a preferred crosslink density are obtained when these compounds simultaneously satisfy the equations:

$$0.4 \leq [\text{number of moles of } A/\text{number of moles of } B] \leq 1.2 \quad (\text{II'})$$

$$0.05 \leq [(\text{number of moles of } E \times \text{valence of } E)/(\text{number of moles of } B \times 2)] \leq 1.0 \quad (\text{III'})$$

and particularly when equation (II') has a lower limit of 0.6 and an upper limit of 1.0 and equation (III') has a lower limit of 0.1 and an upper limit of 0.6.

Two or more species of each of compounds (A), (B) and (E) may be used. In the reaction of linear copolymer (C') with polyfunctional compound (E), compound (A) and/or (B) may be further added.

An electrolyte and a solvent required for forming these ionically conductive composition may be added before or after the reaction of a linear copolymer (C') with polyfunctional compound (E). Alternatively, only part of them may be added before the reaction and then the remainder may be added. Processes for preparing ionically conductive compositions comprising the corssliked copolymer containing linear copolymer (C') as a base unit will be described in detail later.

According to the fourth aspect of the present invention, an ionically conductive composition is provided, comprising:

a crosslinked polysiloxane polymer having a network structure obtained by reacting said polyfunctional compound (D-1), said compound (E-1) and a compound (F) having an unsaturated hydrocarbon group at one end, which compound (F) is represented by the formula:

wherein $R^{41}$ independently represents a hydrogen atom, a substituted or unsubstituted alkyl group containing 1 to 18 carbon atoms, or a substituted or unsubstituted aryl group containing 6 to 20 carbon atoms, $R^{42}$ represents an alkylene group containing 1 to 18 carbon atoms, a substituted or unsubstituted arylene group containing 6 to 20 carbon atoms, an arylalkylene group containing 7 to 21 carbon atoms, or a direct bond, $R^{43}$ represents a hydrogen atom, a substituted or unsubstituted alkyl group containing 1 to 18 carbon atoms, or a substituted or unsubstituted aryl group containing 6 to 20 carbon atoms, and $A^2$ represents a divalent group; and an electrolyte.

In formula (F), examples of the alkyl and aryl groups represented by $R^{41}$ and $R^{43}$ are the same as listed for $R^{21}$ in compound (A-1), and examples of the alkylene, arylene and arylalkylene groups represented by $R^{42}$ are the same as listed for $R^{22}$ in compound (A-1). $A^2$ represents a divalent chain derived from an alkylene, a polyoxyalkylene, a polycarbonate or carbonate, a polyester or ester, a polyacrylate or a polymethacrylate. Preferably, $R^{41}$ is a hydrogen atom or a methyl group, $R^{42}$ is a methylene group or a direct bond, $A^2$ is a polyoxyalkylene chain or a polycarbonate or carbonate or a polyester or ester chain containing an oxyalkyelene group, and $R^{43}$ represents is a methyl or ethyl group. Most preferably, $A^2$ is a polyoxyalkylene chain.

Specific examples of compound (F) include the following compounds:

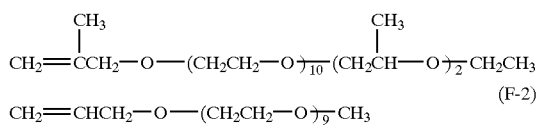

(F-1)

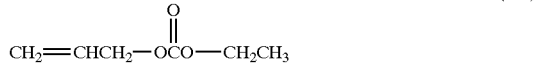

(F-2)

(F-3)

These compounds may be simultaneously reacted to give a polysiloxane crosslinked polymer, or compound (E) and compound (F) may be preliminarily reacted to prepare modified polysiloxane compound (G) having two or more hydrosilyl groups, which may be further reacted with polyfunctional compound (D-1) to give a polysiloxane crosslinked polymer.

For example, (E-1) having 8 hydrosilyl groups per mole is reacted with 6 moles of (F-1) to give a modified polysiloxane compound (G) wherein (F-1) is grafted to 6 hydrosilyl groups in average and two hydrosilyl groups remain. The resulting compound is crosslinked with polyfunctional compound (D-1) to give a polysiloxane crosslinked polymer.

In the reaction with polyfunctional compound (D-1), compound (G) may be used in combination with compound (A-1), compound (B-1) or dimethyl silane, and/or linear copolymer (C) to form a polysiloxane polymer. A plurality of modified polysiloxane compounds (G) having two or more hydrosilyl groups may be combined.

When polyfunctional compound (D-1) is used to form a crosslinked polysiloxane polymer, the molar ratio of the unsaturated group of compound (D-1) to the hydrosilyl group available for the addition reaction thereto is about 0.8–1.2 and more preferably about 0.9–1.1.

In case where a modified polysiloxane compound (G) is preliminarily prepared and then reacted with polyfunctional compound (D-1) to give a crosslinked polysiloxane polymer of the present invention, a polymer having a preferred crosslink density is obtained when compound (G) and polyfunctional compound (D-1) satisfy the equation:

$0.8 \leq [(\text{number of moles of }(D\text{-}1) \times \text{valence of }(D\text{-}1))/(\text{number of moles of }G \times \text{valence of }G)] \leq 1.2$ (IV).

In case where compounds (E), (F) and (D-1) are simultaneously reacted to give a crosslinked copolymer of the present invention, a copolymer having a preferred crosslink density is obtained when these compounds simultaneously satisfy the equations:

$0.4 \leq [\text{number of moles of }F/(\text{number of moles of }E \times \text{valence of }E)] \leq 1.2$ (V)

and $0.05 \leq [(\text{number of moles of }(D\text{-}1) \times \text{valence of }(D\text{-}1))/(\text{number of moles of }E \times \text{valence of }E)] \leq 1.0$ (VI)

and particularly when equation (V) has a lower limit of 0.6 and an upper limit of 1.0 and equation (VI) has a lower limit of 0.1 and an upper limit of 0.6.

An ionically conductive composition of the present invention can be prepared by mixing a polymer as described above with an electrolyte and, if desired, mixing or impregnating the mixture with a solvent, a modified silicone and other components conventionally added to the ionically conductive composition. These components may be wholly or partially added to the reactants before a polymerization, and the remainder may be added after the polymerization.

Polymers of the present invention are present in an amount of 1–99% by weight and preferably 2–49% by weight in the ionically conductive composition of the present invention.

The term "modified silicone" means a derivative of dimethyl polysiloxane wherein methyl groups are partially replaced with polyether groups, polyester groups, alkoxy groups, alcohol groups, carboxy groups, epoxy-containing groups, amino-containing groups, alkyl groups, phenyl groups or the like. The modifying groups are incorporated into the polysiloxane in the form of pendant groups or straight chains at one or both ends and/or as side chain. Two or more substituents may exist in the modified silicone. These modified silicones have a viscosity of 10000 cP or less, preferably 2000 cP or less, and more preferably 1000 cP or less at 40° C. These modified silicones are mixed in a amount of 0.01–50% by weight, and preferably 0.1–10% by weight in the ionically conductive composition of the present invention.

Suitable modified silicones are preferably polyether-modified silicones having polyether group(s) as a pendant and are represented by the formula (X):

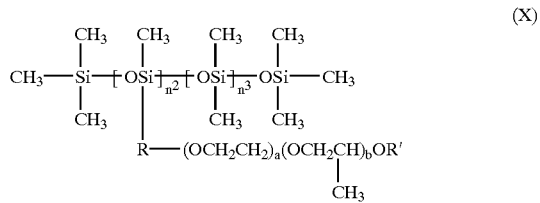

(X)

wherein R independently represents an alkyl group containing 2 to 4 carbon atoms (for example, ethyl, propyl, butyl), R' represents a hydrogen atom or an alky group containing 1 to 4 carbon atoms (for example, methyl, ethyl, propyl, butyl), $n^2$ represents an integer of 1 to 30, $n^3$ represents an integer of 0 to 20, a represents an integer of 1 to 20, and b represents an integer of 0 to 20. Specific examples include the following compounds:

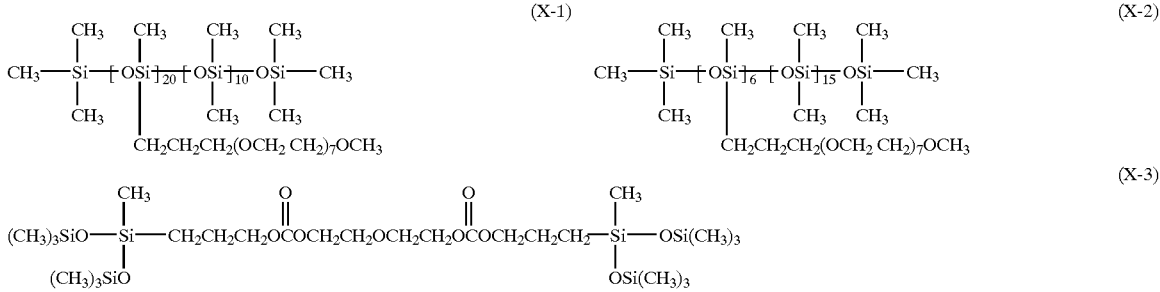

The viscosity of compound (X-1) was 173 cP at 40° C. as measured by a Brookfield viscometer (Tokyo Keiki) using rotor #2 at a rotation speed of 60 rpm.

Electrolytes for forming the ionically conductive composition include fluorides such as lithium fluoride, sodium fluoride, potassium fluoride, and calcium fluoride; chlorides such as lithium chloride, sodium chloride, and calcium chloride; metal bromides; metal iodides; metal perchlorinates; metal hypochlorinats; metal acetates; metal formates; metal permanganates; metal phosphates, metal sulfates; metal nitrates; metal thiosulfates; metal thiocyanates; and ammonium salts such as ammonium sulfate and tetra-n-butylammonium perchlorate. Lithium salts may be used for lithium batteries, including $LiAlCl_4$, $LiClO_4$, $LiBF_4$, $LiPF_6$, $LiAsF_6$, $LiCF_3SO_3$, $Li(CF_3SO_2)_2N$, $Li(CF_3SO_2)_3C$ and/or $LiBPh_4$ wherein Ph represents a phenyl group. These electrolytes are present in an amount of 0.1–60% by weight, and preferably 1.0–40% by weight in the ionically conductive composition of the present invention.

The ionically conductive polymer may also contain a polyalkylene oxide compound such as tetraethylene glycol dimethyl ether or tetrapropylene glycol dimethyl ether; a modified polyacrylate having a polyalkylene oxide as a structural unit; a polyacrylonitrile; a polyvinylidene fluoride; and/or a modified polyphosphazenes having a polyalkylene oxide as a structural unit.

Once a polysiloxane polymer having a network structure is formed in an electrolyte solution, an ionically conductive gel or a gel electrolyte is formed. It is desired that the gel electrolyte has an excellent form retention and ion conductivity and is free from leakage and, for these reasons, it should be formed by a small amount of the crosslinked polymer and have a high storage elastic modulus which is the indicative of gel strength. The storage elastic modulus is a value representing mechanical properties, which is obtained by applying dynamic stresses of varying frequencies to a determined size of gel and then measuring the range of strain corresponding to the range of frequency or measuring the dynamic stress generating a determined range of strain. The measurement of strain can be carried out by, for example, RSA-II available from Rheometric Scientific, and the measurement of dynamic stress can be carried out by, for example, DMA-7 available from Perkin Elmer. A gel is considered to be harder as the storage elastic modulus is higher. For example, the moduli are on the order of $10^{-2}$ for water, $10^{10}$ for polystyrene, and $10^{12}$ for tungsten.

Suitable solvents include inorganic solvents such as water, thionyl chloride, sulfuryl chloride and liquid ammonia; sulfur-containing compounds such as thiophene and diethyl sulfide; nitrogen-containing compounds such as acetonitrile, diethylamine and aniline; fatty acids such as acetic acid, butyric acid and anhydrides thereof; ethers; acetals; ketones such as cyclohexanone; esters; phenols; alcohols; hydrocarbons; halogenated hydrocarbons; dimethyl polysiloxane, etc. Particularly suitable solvents for lithium secondary batteries are sulfur-containing compounds such as purified dimethyl sulfoxide and sulfolane; ester compounds having a carbonyl bond such as propylene carbonate, ethylene carbonate, γ-butyrolactone, dimethyl carbonate and diethyl carbonate; and ether compounds such as tetrahydrofuran, 2-methoxytetrahydrofuran, 1,3-dioxolane, 1,2-dimethoxyethane, 1,2-ethoxyethane and 1,3-dioxane. These solvents may be used alone or in combination and are present in an amount of 1–99% by weight, preferably 50–97% by weight, and more preferably 80–97% by weight in ionically conductive composition of the present invention. In order to allow the composition to have good mechanical properties and ionic conductivity, the amount of solvent is preferably 50–95% by weight. Then, the storage elastic modulus of the gel electrolyte is preferably 5000 Pa or more. The storage elastic modulus is the amount which is the indicative of mechanic properties of a gel, and it is of course preferred that this frequency characteristic does not widely vary to show good form stability.

It is said that an ionically conductive composition should have an ionic conductivity of about $10^{-3}$ S/cm at room temperature for use in a battery. Thus, it preferably has an ionic conductivity of 50% or more of the ionic conductivity for the electrolyte solution itself. It is not preferred that ionic conductivity is lowered particularly at a low temperature of about −20° C. because of inconveniences such as limitation of service environment.

Without wishing to be bound to any theory, the polymers of the present invention are believed to have a more regular and homogeneous molecular structure than conventional polymers and thus allow an electrolyte or both electrolyte and solvent to be maintained in dispersion system more stably than the conventional polymers and thus they can provide a composition having good form retention and ionic conductivity.

According to the fifth aspect of the present invention, a process for preparing a battery containing the ionically conductive composition and a battery prepared therefrom are provided.

There are various processes for preparing a battery, such as involving preliminarily preparing an outer shell of a battery, charging reactants for an ionically conductive composition into the outer shell and then inducing a reaction of the reactants by heating to give an ionically conductive composition, or assembling a battery after formation of an ionically conductive composition. In order to improve the form retention or shut-down effect of ionically conductive composition, porous films or non-woven fabrics formed from thermoplastic resins or thermoplastic resin particles may also be used. When the porous films or non-woven fabrics of thermoplastic resins are used, these films or non-woven fabrics are impregnated with the ionically conductive composition of the present invention.

The porous films made of thermoplastic resins are films of, for example, polyethylene, polypropylene or the like made porous by uniaxial orientation or other means. Suitably, they have a weight of about 5 g/m² to 30 g/m².

Suitable non-woven fabric sheets formed from thermoplastic resins have excellent electrolyte retentivity and low resistance to the ionic conductivity of the resulting polymer electrolyte or gel electrolyte. Non-woven fabrics can be prepared by either wet or dry process, and have a basis weight of 100 g/m² or less, and preferably 5–50 g/m². Suitable fiber materials include, but not limited to, polyester, polypropylene, polyethylene, Teflon, etc.

The thermoplastic resin particles are fine particles of the materials such as polyethylene, polypropylene, Teflon or the like having a diameter of 20 μm or less, and preferably 10 μm or less. Such fine particles are synthesized by emulsion polymerization or prepared by grounding. The particles are preferably added in the proportion of about 5% to 50%. A gel containing particles may be deformed into a determined form under heat and pressure and then used as an ionically conductive composition.

Lithium primary batteries may use metallic lithium as an anode, and graphite fluoride, γ-β manganese dioxide, sulfur dioxide, thionyl chloride, iodine/poly(2-vinylpyridine), $Ag_2CrO_4$, vanadium pentoxide, CuO, $MoO_3$ or the like as a cathode. The ionically conductive composition of the present invention is used as an alternative to an electrolyte of primary battery. The battery is used in the form of a coin, cylinder or sheet (paper).

A cathode material used in a lithium secondary battery is prepared from a cathode active material, such as $LiCoO_2$, $LiNiO_2$, spinel $LiMn_2O_4$, amorphous $V_2O_5$, a mixture of β-$MnO_2$ and $Li_2MnO_3$, $Li_{4/3}Mn_{5/3}O_4$ of spinel superlattice structure, or an organic disulfide compound such as 2,5-dimercapto-3,4-thiadiazole, by powdering the cathode active material and mixing the powdered material with a conductive material such as acetylene black and a thickener selected from organic polymer compounds. The cathode material is coated on a cathode current collector such as aluminum to form a porous coating.

An anode material is prepared from an anode active material, such as metallic lithium, lithium-aluminum alloy, Li—Pb—Cd—In alloys, a lithium-graphite compound, a lithium-non-graphitizable carbon compound, a lithium-amorphous tin composite oxide, or an amorphous cobalt-substituted lithium nitride, by depositing the anode material on a nickel plate or the like in case that the anode material is metal or by powdering the anode material and mixing the powdered material with a conductive material such as acetylene black and a thickener selected from organic polymer compounds in the same manner as the cathode material in case that the anode is not metal. In case that the anode material is a paste, it is coated on an anode current collector such as copper to form a porous coating. The ionically conductive composition of the present invention is used as an alternative to an electrolyte of secondary battery. The secondary battery is used in the form of a coin, cylinder or sheet, similarly to primary battery.

The following examples further illustrate the present invention, without limiting the same thereto.

EXAMPLES

Example 1

A bis-epoxy compound having the structure;

Compound (1-1)

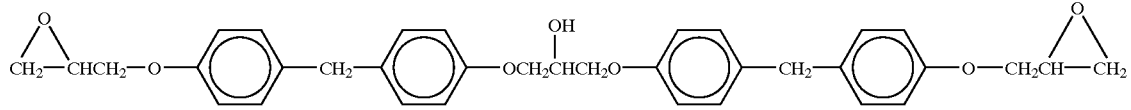

and a diamine having the structure:

Compound (1-2)

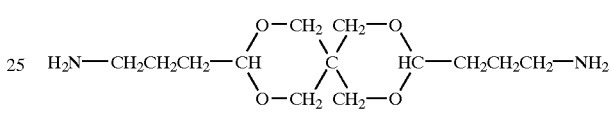

were mixed as follows.

| Compound (1-1) | 56.8 parts by weight |
| Compound (1-2) | 27.4 parts by weight |
| Tetra-n-butylammonium perchlorate | 10 parts by weight |
| N,N-dimethylformamide | 80 parts by weight |

These components were mixed at room temperature and the mixture was heated at 100° C. for 6 hrs to give ionically conductive gel composition 1. This ionically conductive gel composition 1 has an ionic conductivity of $5 \times 10^{-5}$ S/cm.

Example 2

The following materials were mixed as follows.

| Compound (A-1-1) | 108 parts by weight |
| Compound (B-1-1) | 160 parts by weight |
| Propylene carbonate | 54 parts by weight |
| Lithium perchlorate | 31 parts by weight |
| 0.3% Platinum catalyst | 2.5 parts by weight |

A non-woven fabric cloth having a basis weight of 15 g/m² and a thickness of 30 μm was impregnated with this mixture, and heated at 90° C. for 1 hr to give ionically conductive gel composition 2 having a thickness of 32 μm. This ionically conductive gel composition 2 has a storage elastic modulus of $6.5 \times 10^3$ Pa and an ionic conductivity of $5.5 \times 10^{-4}$ S/cm.

A cathode layer and an anode layer were removed from a commercially available lithium secondary battery, and metallic aluminum, the cathode layer, ionically conductive gel composition 2, the anode layer and metallic copper were laminated to prepare a lithium secondary battery. When this battery was charged and discharged at a current value of 0.1 mA, it operated as a secondary battery at a capacity of 1.8 mAh/cm².

Example 3

The following materials were mixed as follows.

| | |
|---|---|
| Compound (A-1-4) | 52.5 parts by weight |
| Compound (B-1-4) | 21.6 parts by weight |
| Compound (D-1-1) | 2.62 parts by weight |
| Propylene carbonate | 900 parts by weight |
| 1,2-Dimethoxyethane | 300 parts by weight |
| Lithium perchlorate | 136 parts by weight |
| 0.3% Platinum catalyst | 0.2 parts by weight |

Then, this solution was coated on metallic lithium to a thickness of about 15 μm and gelled by heating at 60° C. The solution was also coated on a cathode of manganese dioxide and gelled in the same manner as described above. A small amount of propylene carbonate was interposed between these two electrode materials to form a coin battery. It operated as a primary battery at an initial output of 3 V.

Example 4

The following materials were mixed as follows.

| | |
|---|---|
| Compound (A-1-1) | 84.1 parts by weight |
| Compound (B-1-4) | 67.3 parts by weight |
| Compound (D-1-1) | 13.7 parts by weight |
| Ethylene carbonate | 920 parts by weight |
| Propylene carbonate | 1380 parts by weight |
| Lithium trifluoromethanesulfonate | 455 parts by weight |
| 0.3% Platinum catalyst | 1.2 parts by weight |

A non-woven fabric cloth having a basis weight of 15 g/m² and a thickness of 30 μm was impregnated with this mixture, and heated at 90° C. for 1 hr to give ionically conductive gel composition 3 having a thickness of 32 μm. This ionically conductive gel composition 3 has a storage elastic modulus of $0.9 \times 10^5$ Pa and an ionic conductivity of $0.9 \times 10^{-3}$ S/cm.

A cathode layer and an anode layer were removed from a commercially available lithium secondary battery, and metallic aluminum, the cathode layer, ionically conductive gel composition 3, the anode layer and metallic copper were laminated to prepare a lithium secondary battery. When this battery was charged and discharged at a current value of 0.1 mA, it operated as a secondary battery at a capacity of 1.8 mAh/cm².

Example 5

The following materials were mixed as follows.

| | |
|---|---|
| Compound (A-1-1) | 10.9 parts by weight |
| Compound (B-1-1) | 16.1 parts by weight |
| Compound (X-1) | 19.8 parts by weight |
| Lithium trifluoromethanesulfonate | 7.8 parts by weight |
| 0.3% Platinum catalyst | 0.17 parts by weight |

This mixture was developed on a plane and heated at 90° C. for 1 hr to give ionically conductive composition 4 having a thickness of 40 μm. This ionically conductive composition 4 has a storage elastic modulus of $1.5 \times 10^5$ Pa and an ionic conductivity of $5.0 \times 10^{-4}$ S/cm.

A cathode layer and an anode layer were removed from a commercially available lithium secondary battery, and metallic aluminum, the cathode layer, ionically conductive gel composition 4, the anode layer and metallic copper were laminated to prepare a lithium secondary battery. When this battery was charged and discharged at a current value of 0.1 mA, the capacity was 1.6 mAh/cm².

Example 6

A polyethylene glycol having the structure:

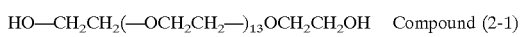

Compound (2-1)

and a diisocyanate having the structure:

Compound (2-2)

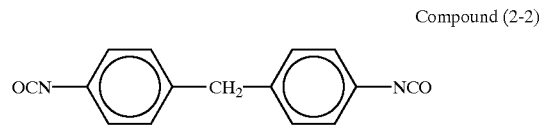

were mixed in the following proportions.

| | |
|---|---|
| Compound (2-1) | 67.8 parts by weight |
| Compound (2-2) | 12.5 parts by weight |

This mixture was heated at 80° C. for 3 hrs to give a polymer. The obtained polymer was mixed with a truisocyanate having the structure:

Compound (2-3)

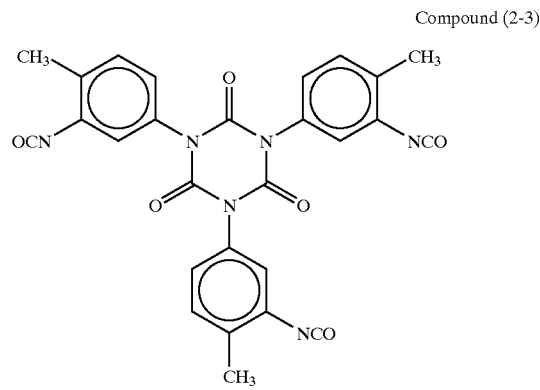

as follows:

| | |
|---|---|
| Polymer | 16.1 parts by weight |
| Compound (2-3) | 3.5 parts by weight |
| Tetrahydrofuran | 10 parts by weight | and the mixture was further heated at 60° C. for 12 hrs.

Then, tetrahydrofuran was removed and the mixture was swollen with 0.1 N aqueous sodium chloride solution to prepare ionically conductive gel composition 5. This ionically conductive gel composition 5 has an ionic conductivity of 0.3 S/cm.

Example 7

The following materials were mixed and the mixture was reacted at 80° C. under a nitrogen atmosphere, after which toluene was removed to synthesize linear block copolymer (C-1) having a hydrosilyl group at each end.

| | |
|---|---|
| Compound (A-1-1) | 84.1 parts by weight |
| Compound (B-1-4) | 67.3 parts by weight |
| Toluene | 151.4 parts by weight |
| 0.3% Platinum catalyst | 0.25 parts by weight |

This block polymer (C-1) was mixed with the following compounds as follows.

| | |
|---|---|
| Block polymer (C-1) | 151.4 parts by weight |
| Compound (D-1-1) | 13.7 parts by weight |
| Ethylene carbonate | 920 parts by weight |
| Propylene carbonate | 1380 parts by weight |
| Lithium trifluoromethanesulfonate | 455 parts by weight |
| 0.3% Platinum catalyst | 1.2 parts by weight |

A non-woven fabric cloth having a basis weight of 15 g/m$^2$ and a thickness of 30 $\mu$m was impregnated with this mixture, and heated at 90° C. for 1 hr to give ionically conductive gel composition 6 having a thickness of 32 $\mu$m. This ionically conductive gel composition 6 has a storage elastic modulus of $1.5 \times 10^4$ Pa and an ionic conductivity of $1.0 \times 10^{-3}$ S/cm.

A cathode layer and an anode layer were removed from a commercially available lithium secondary battery, and metallic aluminum, the cathode layer, ionically conductive gel composition 6, the anode layer and metallic copper were laminated to prepare a lithium secondary battery. When this battery was charged and discharged at a current value of 0.1 mA, it operated as a secondary battery at a capacity of 1.9 mAh/cm$^2$.

Example 8

The following materials were mixed as follows and the mixture was reacted at 80° C. under a nitrogen atmosphere, after which toluene was removed to synthesize linear block copolymer (C-2) having a hydrosilyl group at each end.

| | |
|---|---|
| Compound (A-1-4) | 77.54 parts by weight |
| Compound (B-1-3) | 22.46 parts by weight |
| Toluene | 100.0 parts by weight |
| 0.3% Platinum catalyst | 0.17 parts by weight |

The following materials were further mixed as follows.

| | |
|---|---|
| Block copolymer (C-2) | 2.96 parts by weight |
| Compound (D-1-3) | 0.04 parts by weight |
| Ethylene carbonate | 27.0 parts by weight |
| Diethyl carbonate | 54.8 parts by weight |
| Li(CF$_3$SO$_2$)$_2$N | 45.98 parts by weight |
| 0.3% Platinum catalyst | 0.1 parts by weight |

This mixture was gelled in a sealed vessel having a thickness of 2 mm to give ionically conductive gel composition 7. The ionic conductivity of this ionically conductive gel composition 7 is determined to be $3 \times 10^{-3}$ S/cm at room temperature and $0.9 \times 10^{-3}$ S/cm at −20° C., which represent 80% of the ionic conductivity at room temperature and 75% at −20° C. of an electrolyte solution containing 27 parts by weight of ethylene carbonate, 54.8 parts by weight of diethyl carbonate and 15.2 parts by weight of lithium hexafluorophosphate, respectively. This ionically conductive gel composition 7 has a storage elastic modulus of $1 \times 10^4$ Pa at room temperature.

A cathode layer and an anode layer were removed from a commercially available lithium secondary battery, and metallic aluminum, the cathode layer, ionically conductive gel composition 7, the anode layer and metallic copper were laminated to prepare a lithium secondary battery. When this battery was charged and discharged at a current value of 0.4 mA, it operated as a secondary battery at a capacity of 1.8 mAh/cm$^2$.

Example 9

The following materials were mixed and the mixture was reacted at 80° C. under a nitrogen atmosphere, after which toluene was removed to synthesize linear block copolymer (C-3) having a hydrosilyl group at each end.

| | |
|---|---|
| Compound (A-1-3) | 73 parts by weight |
| Compound (B-1-5) | 11.7 parts by weight |
| Toluene | 84.1 parts by weight |
| 0.3% Platinum catalyst | 0.14 parts by weight |

The following materials were further mixed as follows.

| | |
|---|---|
| Block copolymer (C-3) | 6.6 parts by weight |
| Compound (D-1-4) | 0.24 parts by weight |
| Propylene carbonate | 80 parts by weight |
| Li(CF$_3$SO$_2$)$_2$N | 45.98 parts by weight |
| Compound (X-2) | 5 parts by weight |
| PP particles of 6 $\mu$m in particle diameter | 15 parts by weight |
| 0.3% Platinum catalyst | 0.06 parts by weight |

This mixture was developed on a plane to give ionically conductive composition 8. This ionically conductive composition 8 has an ionic conductivity of $2 \times 10^{-3}$ S/cm. This composition was coated on metallic lithium to a thickness of 25 $\mu$m and gelled, and combined with a cathode of lithium cobaltate to prepare a sheet battery. When this battery was charged and discharged at a current value of 0.4 mA, it operated as a secondary battery at a capacity of 1.7 mAh/cm$^2$.

Example 10

Block polymer (C-2) described in Example 8 was mixed with the following compounds as follows.

| | |
|---|---|
| Block polymer (C-2) | 7.41 parts by weight |
| Compound (A-1-5) | 0.27 parts by weight |
| Compound (D-1-5) | 0.032 parts by weight |
| Ethylene carbonate | 31.1 parts by weight |
| Diethyl carbonate | 31.1 parts by weight |
| Lithium tetrafluoroborate | 7.23 parts by weight |
| 0.3% Platinum catalyst | 0.06 parts by weight |

A non-woven fabric cloth having a basis weight of 15 g/m$^2$ and a thickness of 30 $\mu$m was inserted between an anode of lithium cobaltate and a cathode of carbon, and the mixed solution prepared was inpoured as an alternative to an electrolyte under reduced pressure. The mixed solution was gelled by heating at 100° C. for 10 min in a sealed vessel to prepare a lithium secondary battery. When this battery was charged and discharged at a current value of 0.2 mA, it operated as a secondary battery at a discharge capacity of 1.6 mAh/cm² initially and 1.1 mAh/cm² even after 100 cycles of charging and discharging.

Example 11

Block polymer (C-2) described in Example 8 was mixed with the following compounds as follows.

| | |
|---|---|
| Block polymer (C-2) | 7.4 parts by weight |
| Compound (B-1-4) | 0.025 parts by weight |
| Compound (D-1-12) | 0.20 parts by weight |
| Ethylene carbonate | 45 parts by weight |
| Diethyl carbonate | 45 parts by weight |
| Lithium perchlorate | 10.74 parts by weight |
| 0.3% Platinum catalyst | 1.09 parts by weight |

This mixture was heated at 90° C. for 30 min to give ionically conductive gel composition 9. This ionically conductive gel composition 9 has an ionic conductivity of $0.7 \times 10^{-3}$ S/cm.

Example 12

The following materials were mixed and the mixture was reacted at 80° C. under a nitrogen atmosphere, after which toluene was removed to synthesize linear block copolymer (C-4) having a hydrosilyl group at each end.

| | |
|---|---|
| Compound (A-1-5) | 5.48 parts by weight |
| Compound (B-1-4) | 20.16 parts by weight |
| Toluene | 25.64 parts by weight |
| 0.3% Platinum catalyst | 0.04 parts by weight |

This block copolymer (C-4) was mixed with the following materials as follows.

| | |
|---|---|
| Block copolymer (C-4) | 25.64 parts by weight |
| Compound (A-1-3) | 55.04 parts by weight |
| Compound (B-1-5) | 2.08 parts by weight |
| Compound (D-1-4) | 2.09 parts by weight |
| Propylene carbonate | 407.3 parts by weight |
| Ethylene carbonate | 407.3 parts by weight |
| Lithium hexafluorophosphate | 161.1 parts by weight |
| 0.3% Platinum catalyst | 1.4 parts by weight |

A non-woven fabric cloth having a basis weight of 15 g/m² and a thickness of 30 μm was impregnated with this mixture, and heated at 90° C. for 30 min to give ionically conductive gel composition 10 having a thickness of 32 μm. This ionically conductive gel composition 10 has a storage elastic modulus of $3.0 \times 10^4$ Pa and an ionic conductivity of $1.0 \times 10^{-3}$ S/cm.

Example 13

The following materials were mixed and the mixture was reacted at 80° C. under a nitrogen atmosphere, after which toluene was removed to synthesize linear block copolymer (C-5) having a hydrosilyl group at each end.

| | |
|---|---|
| Compound (A-1-3) | 58.5 parts by weight |
| Compound (B-1-4) | 20.16 parts by weight |
| Toluene | 78.66 parts by weight |
| 0.3% Platinum catalyst | 0.13 parts by weight |

Then, the following compounds were mixed as follows.

| | |
|---|---|
| Block polymer (C-5) | 7.87 parts by weight |
| Compound (D-1-4) | 0.160 parts by weight |
| Ethylene carbonate | 76.3 parts by weight |
| Diethyl carbonate | 154.9 parts by weight |
| Lithium perchlorate | 28.48 parts by weight |
| 0.3% Platinum catalyst | 2.67 parts by weight |

A coin battery can (2032) was charged with this mixture and sealed, and heated at 80° C. for 20 min to prepare a battery containing an ionically conductive gel composition. Then, the above formulation and heating conditions were used to give ionically conductive gel composition 11, which was then determined for the temperature dependency of the ionic conductivity by the impedance method.

First, an electrolyte solution was prepared with the following formulation and then determined for the temperature dependency of the ionic conductivity by the impedance method.

| | |
|---|---|
| Ethylene carbonate | 29.49 parts by weight |
| Diethyl carbonate | 59.87 parts by weight |
| Lithium perchlorate | 10.64 parts by weight |

The ionic conductivity of the electrolyte solution was $1.2 \times 10^{-3}$ S/cm at room temperature and $0.33 \times 10^{-3}$ S/cm at −20° C., while the ionic conductivity of ionically conductive gel composition 11 was $0.98 \times 10^{-3}$ S/cm (82% of the conductivity of the electrolyte solution) at room temperature and $0.25 \times 10^{-3}$ S/cm (76% of the conductivity of the electrolyte solution) at −20° C. The battery operated even in an environment at −20° C. though capacity loss was observed.

Example 14

The following compounds were mixed and the mixture was reacted at 80° C. under a nitrogen atmosphere, after which toluene was removed to synthesize linear block copolymer (C-6) having a hydrosilyl group at each end.

| | |
|---|---|
| Compound (A-1-2) | 80 parts by weight |
| Compound (B-1-6) | 26.8 parts by weight |
| Toluene | 92 parts by weight |
| 0.3% Platinum catalyst | 0.18 parts by weight |

Then, the following compounds were mixed as follows.

| | |
|---|---|
| Block polymer (C-6) | 10.68 parts by weight |
| Compound (D-1-1) | 1.98 parts by weight |
| Compound (X-3) | 4.71 parts by weight |
| Propylene carbonate | 90 parts by weight |
| Lithium hexafluorophosphate | 19.23 parts by weight |

| | |
|---|---|
| 0.3% Platinum catalyst | 0.42 parts by weight |

This mixture was charged between an anode of metallic lithium and a cathode of lithium nickelate and heated to form a gel electrolyte layer of 20 μm of a lithium secondary battery. When this battery was charged at a current value of 0.2 mA, an output of 2.0 mAh/cm² was obtained.

Example 15

Block polymer (C-2) described in Example 8 was mixed with the following compounds as follows.

| | |
|---|---|
| Block polymer (C-2) | 7.41 parts by weight |
| Compound (D-1-3) | 0.165 parts by weight |
| Compound (X-2) | 10 parts by weight |
| Propylene carbonate | 90 parts by weight |
| Lithium hexafluorophosphate | 15.2 parts by weight |
| 0.3% Platinum catalyst | 0.07 parts by weight |

This mixture was gelled in a sealed vessel having a thickness of 2 mm to give ionically conductive gel composition 12. This ionically conductive gel composition 12 has an ionic conductivity of $1.0 \times 10^{-3}$ S/cm.

Example 16

The following materials were mixed as follows.

| | |
|---|---|
| Compound (E-1-1) | 43.5 parts by weight |
| Compound (A-1-1) | 50.2 parts by weight |
| Compound (F-1) | 72.6 parts by weight |
| Compound (D-1-8) | 21.2 parts by weight |
| Ethylene carbonate | 74 parts by weight |
| Dimethoxyethane | 73.5 parts by weight |
| Lithium perchlorate | 40 parts by weight |
| 0.3% Platinum catalyst | 2.5 parts by weight |

A non-woven fabric cloth having a basis weight of 15 g/m² and a thickness of 30 μm was impregnated with this mixture, and heated at 90° C. for 1 hr to give ionically conductive gel composition 13 having a thickness of 32 μm. This ionically conductive gel composition 13 has a storage elastic modulus of $1.4 \times 10^5$ Pa and an ionic conductivity of $6.0 \times 10^{-4}$ S/cm.

A cathode layer and an anode layer were removed from a commercially available lithium secondary battery, and metallic aluminum, the cathode layer, ionically conductive gel composition 13, the anode layer and metallic copper were laminated to prepare a lithium secondary battery. When this battery was charged and discharged at a current value of 0.1 mA, the capacity was 2.0 mAh/cm².

Example 17

The following materials were mixed and the mixture was reacted at 80° C. under a nitrogen atmosphere, after which toluene was removed to synthesize modified polysiloxane compound (G-1).

| | |
|---|---|
| Compound (E-1-1) | 117 parts by weight |
| Compound (F-1) | 393.6 parts by weight |
| Toluene | 205 parts by weight |
| 0.3% Platinum catalyst | 0.85 parts by weight |

Then, the synthesized modified polysiloxane compound (G-1) was mixed with the following materials as follows.

| | |
|---|---|
| Compound (G-1) | 5.1 parts by weight |
| Compound (D-1-6) | 0.51 parts by weight |
| Ethylene carbonate | 52.8 parts by weight |
| Diethyl carbonate | 38.8 parts by weight |
| Lithium hexafluorophosphate | 15.2 parts by weight |
| 0.3% Platinum catalyst | 0.08 parts by weight |

Then, the prepared mixture was charged between a carbon anode and a lithium manganate cathode and heated in a sealed vessel to prepare a gel electrolyte layer of 20 μm of a battery. When this battery was charged, it discharged and operated as a lithium secondary battery.

Example 18

The following materials were mixed and the mixture was reacted at 80° C. under a nitrogen atmosphere, after which toluene was removed to synthesize modified polysiloxane compound (G-2).

| | |
|---|---|
| Compound (E-1-2) | 194.2 parts by weight |
| Compound (F-3) | 39.0 parts by weight |
| Toluene | 233 parts by weight |
| 0.3% Platinum catalyst | 0.39 parts by weight |

Then, the synthesized modified polysiloxane compound (G-2) was mixed with the following materials as follows.

| | |
|---|---|
| Compound (G-2) | 23.32 parts by weight |
| Compound (B-1-5) | 1.20 parts by weight |
| Compound (D-1-5) | 4.67 parts by weight |
| Ethylene carbonate | 28.88 parts by weight |
| Diethyl carbonate | 28.88 parts by weight |
| Li(CF$_3$SO$_2$)$_2$N | 31.1 parts by weight |
| 0.3% Platinum catalyst | 0.6 parts by weight |

This mixture was developed on a plane and gelled to give ionically conductive composition 14, which has an ionic conductivity of $0.9 \times 10^{-3}$ S/cm.

Example 19

Compound (G-2) described in Example 18 was mixed with the following compounds as follows.

| | |
|---|---|
| Compound (G-2) | 23.32 parts by weight |
| Compound (A-1-2) | 0.52 parts by weight |
| Compound (B-1-5) | 1.20 parts by weight |
| Compound (D-1-5) | 4.50 parts by weight |
| Propylene carbonate | 36.46 parts by weight |
| Lithium perchlorate | 7.86 parts by weight |

| | |
|---|---|
| 0.3% Platinum catalyst | 0.74 parts by weight |

A non-woven fabric cloth having a basis weight of 15 g/m² and a thickness of 30 μm was impregnated with this mixture, and heated at 90° C. for 1 hr to give ionically conductive gel composition 15 having a thickness of 32 μm. This ionically conductive gel composition 15 has a storage elastic modulus of $1.2 \times 10^5$ Pa and an ionic conductivity of $0.7 \times 10^{-3}$ S/cm.

A cathode layer and an anode layer were removed from a commercially available lithium secondary battery, and metallic aluminum, the cathode layer, ionically conductive gel composition 15, the anode layer and metallic copper were laminated to prepare a lithium secondary battery. When this battery was charged and discharged at a current value of 0.5 mA, it operated as a secondary battery at a capacity of 1.3 mAh/cm².

Example 20

The following materials were mixed as follows.

| | |
|---|---|
| Compound (E-1-1) | 43.5 parts by weight |
| Compound (A-1-1) | 50.2 parts by weight |
| Compound (F-1) | 72.6 parts by weight |
| Compound (D-1-1) | 14.4 parts by weight |
| Compound (X-1) | 12.3 parts by weight |
| Ethylene carbonate | 56 parts by weight |
| Propylene carbonate | 56 parts by weight |
| Lithium trifluoromethanesulfonate | 56.4 parts by weight |
| 0.3% Platinum catalyst | 1.5 parts by weight |

This mixture was developed on a plane and heated at 90° C. for 1 hr to give ionically conductive composition 16 having a thickness of 40 μm. This ionically conductive composition 16 has a storage elastic modulus of $3.5 \times 10^5$ Pa and an ionic conductivity of $5.0 \times 10^{-4}$ S/cm.

A cathode layer and an anode layer were removed from a commercially available lithium secondary battery, and metallic aluminum, the cathode layer, ionically conductive gel composition 16, the anode layer and metallic copper were laminated to prepare a lithium secondary battery. When this battery was charged and discharged at a current value of 0.1 mA, it operated as a secondary battery at a capacity of 1.8 mAh/cm².

Example 21

The following materials were mixed and the mixture was reacted at 80° C. under a nitrogen atmosphere, after which toluene was removed to synthesize linear block copolymer (C-7) having a vinyl group at each end.

| | |
|---|---|
| Compound (A-1-4) | 7.87 parts by weight |
| Compound (B-1-2) | 1.44 parts by weight |
| 0.3% Platinum catalyst | 0.02 parts by weight |
| The following materials were mixed as follows. | |
| Block polymer (C-7) | 9.3 parts by weight |
| Compound (E-1-3) | 0.18 parts by weight |
| Propylene carbonate | 45.0 parts by weight |
| Ethylene carbonate | 46.0 parts by weight |
| Li(CF₃SO₂)₂N | 54.45 parts by weight |

| | |
|---|---|
| 0.3% Platinum catalyst | 1.17 parts by weight |

A non-woven fabric cloth having a basis weight of 15 g/m² and a thickness of 30 μm was impregnated with this mixture, and heated at 90° C. for 1 hr to give ionically conductive gel composition 17 having a thickness of 32 μm. This ionically conductive gel composition 17 has a storage elastic modulus of $9 \times 10^4$ Pa and an ionic conductivity of $9.5 \times 10^{-4}$ S/cm.

A cathode layer and an anode layer were removed from a commercially available lithium secondary battery, and metallic aluminum, the cathode layer, ionically conductive gel composition 17, the anode layer and metallic copper were laminated to prepare a lithium secondary battery. When this battery was charged and discharged at a current value of 0.1 mA, the capacity was 1.9 mAh/cm².

Example 22

The following materials were mixed as follows and the mixture was heated at 60° C. to give a gel composition.

| | |
|---|---|
| Compound (A-1-4) | 52.5 parts by weight |
| Compound (B-1-4) | 21.6 parts by weight |
| Compound (D-1-1) | 2.62 parts by weight |
| Propylene carbonate | 450 parts by weight |
| 1,2-Dimethoxyethane | 150 parts by weight |
| 0.3% Platinum catalyst | 0.2 parts by weight |

Then, this gel was swollen with 450 parts by weight of propylene carbonate and 150 parts by weight of 1,2-dimethoxyethane in the presence of 91 parts by weight of lithium perchlorate to give ionically conductive gel composition 18, which was then coated on metallic lithium to a thickness of about 15 μm and on a cathode of manganese dioxide. A small amount of propylene carbonate was interposed between these two electrode materials to form a coin battery. It operated as a primary battery at an initial output of 3 V.

Example 23

The following materials were mixed as follows and the mixture was reacted at 80° C. under a nitrogen atmosphere, after which toluene was removed to synthesize linear block copolymer (C-2) having a hydrosilyl group at each end.

| | |
|---|---|
| Compound (A-1-4) | 77.54 parts by weight |
| Compound (B-1-3) | 22.46 parts by weight |
| Toluene | 100.00 parts by weight |
| 0.3% Platinum catalyst | 0.17 parts by weight |

Then, the following materials were mixed as follows, and this mixture was gelled in a sealed vessel having a thickness of 2 mm.

| | |
|---|---|
| Block copolymer (C-2) | 2.96 parts by weight |
| Compound (D-1-3) | 0.04 parts by weight |
| Ethylene carbonate | 13.0 parts by weight |

-continued

| | |
|---|---|
| Diethyl carbonate | 27.0 parts by weight |
| 0.3% Platinum catalyst | 0.1 parts by weight |

Then, this composition was swollen with 14 parts by weight of ethylene carbonate and 27.8 parts by weight of propylene carbonate in the presence of 16.7 parts by weight of lithium trifluoromethanesulfonate to give ionically conductive gel composition 19. The ionic conductivity of this ionically conductive gel composition 19 is determined to be $1.5 \times 10^{-3}$ S/cm.

A cathode layer and an anode layer were removed from a commercially available lithium secondary battery, and metallic aluminum, the cathode layer, ionically conductive gel composition 19, the anode layer and metallic copper were laminated to prepare a lithium secondary battery. When this battery was charged and discharged at a current value of 0.4 mA, it operated as a secondary battery at a capacity of 1.7 mAh/cm².

Example 24

The following materials were mixed and the mixture was reacted at 80° C. under a nitrogen atmosphere, after which toluene was removed to synthesize linear block copolymer (C-3) having a hydrosilyl group at each end.

| | |
|---|---|
| Compound (A-1-3) | 73 parts by weight |
| Compound (B-1-5) | 11.7 parts by weight |
| Toluene | 84.1 parts by weight |
| 0.3% Platinum catalyst | 0.14 parts by weight |

The following materials were further mixed as follows to give a gel composition, which had a storage elastic modulus of $1.8 \times 10^4$ Pa.

| | |
|---|---|
| Block copolymer (C-3) | 6.6 parts by weight |
| Compound (D-1-4) | 0.24 parts by weight |
| Propylene carbonate | 30 parts by weight |
| PP particles of 6 μm in particle diameter | 15 parts by weight |
| Compound (X-2) | 5 parts by weight |
| 0.3% Platinum catalyst | 0.06 parts by weight |

Then, this composition was swollen with 50 parts by weight of propylene carbonate in the presence of 15.2 parts by weight of lithium hexafluorophosphate and developed on a plane to give ionically conductive gel composition 20. This ionically conductive gel composition 20 has an ionic conductivity of $1 \times 10^{-3}$ S/cm. This composition was coated on metallic lithium to a thickness of 25 μm and gelled, and combined with a cathode of lithium cobaltate to prepare a sheet battery. When this battery was charged and discharged at a current value of 0.4 mA, it operated as a secondary battery at a capacity of 1.6 mAh/cm².

Example 25

Block polymer (C-2) described in Example 23 was mixed with the following compounds as follows, and the mixture was gelled by heating at 100° C. for 10 min to give a gel composition.

| | |
|---|---|
| Block polymer (C-2) | 7.41 parts by weight |
| Compound (A-1-5) | 0.27 parts by weight |
| Compound (D-1-5) | 0.032 parts by weight |
| Ethylene carbonate | 15.0 parts by weight |
| Diethyl carbonate | 15.0 parts by weight |
| 0.3% Platinum catalyst | 0.06 parts by weight |

Then, this composition was swollen with 16.1 parts by weight of ethylene carbonate and 16.1 parts by weight of propylene carbonate in the presence of 18.5 parts by weight of $Li(CF_3SO_2)_2N$ to give ionically conductive gel composition 21. A non-woven fabric cloth having a basis weight of 15 g/m² and a thickness of 30 μm was inserted between an anode of lithium cobaltate and a cathode of carbon, and the prepared ionically conductive gel composition 21 was used as an alternative to an electrolyte under reduced pressure to prepare a lithium secondary battery. When this battery was charged and discharged at a current value of 0.2 mA, it operated as a secondary battery at a discharge capacity of 1.5 mAh/cm² initially and 1.1 mAh/cm² even after 100 cycles of charging and discharging.

Example 26

Block polymer (C-2) described in Example 23 was mixed with the following compounds as follows, and the mixture was heated at 90° C. for 30 min to give a gel composition. Thus obtained gel composition has a storage elastic modulus of $1.50 \times 10^4$ Pa.

| | |
|---|---|
| Block polymer (C-2) | 7.4 parts by weight |
| Compound (B-1-4) | 0.025 parts by weight |
| Compound (D-1-12) | 0.20 parts by weight |
| Ethylene carbonate | 35 parts by weight |
| Diethyl carbonate | 35 parts by weight |
| 0.3% Platinum catalyst | 1.09 parts by weight |

Then, this composition was swollen with 10 parts by weight of ethylene carbonate and 10 parts by weight of propylene carbonate in the presence of 7 parts by weight of lithium perchlorate to give ionically conductive gel composition 22. This ionically conductive gel composition 22 has an ionic conductivity of $0.3 \times 10^{-3}$ S/cm.

Example 27

The following materials were mixed as follows and the mixture was reacted at 80° C. under a nitrogen atmosphere, after which toluene was removed to synthesize linear block copolymer (C-5) having a hydrosilyl group at each end.

| | |
|---|---|
| Compound (A-1-3) | 58.5 parts by weight |
| Compound (B-1-4) | 20.16 parts by weight |
| Toluene | 78.66 parts by weight |
| 0.3% Platinum catalyst | 0.13 parts by weight |

Then, the following compounds were mixed, and a non-woven fabric cloth having a basis weight of 15 g/m² and a thickness of 30 μm was impregnated with this mixture and heated at 90° C. for 30 min to give a gel composition.

| Block polymer (C-5) | 7.87 parts by weight |
|---|---|
| Compound (D-1-4) | 0.160 parts by weight |
| Ethylene carbonate | 38 parts by weight |
| Diethyl carbonate | 77 parts by weight |
| 0.3% Platinum catalyst | 2.67 parts by weight |

Then, this composition was swollen with 38.3 parts by weight of ethylene carbonate and 77.9 parts by weight of diethyl carbonate in the presence of 21 parts by weight of lithium perchlorate to give ionically conductive gel composition 23. This ionically conductive gel composition 23 has a storage elastic modulus of $3.0 \times 10^4$ Pa and an ionic conductivity of $0.5 \times 10^{-3}$ S/cm.

Example 28

The following compounds were mixed and the mixture was reacted at 80° C. under a nitrogen atmosphere, after which toluene was removed to synthesize linear block copolymer (C-6) having a hydrosilyl group at each end.

| Compound (A-1-2) | 80 parts by weight |
|---|---|
| Compound (B-1-6) | 26.8 parts by weight |
| Toluene | 92 parts by weight |
| 0.3% Platinum catalyst | 0.18 parts by weight |

Then, the following compounds were mixed and the mixture was heated to give a gel composition.

| Block polymer (C-6) | 10.68 parts by weight |
|---|---|
| Compound (D-1-1) | 1.98 parts by weight |
| Compound (X-3) | 4.71 parts by weight |
| Propylene carbonate | 45 parts by weight |
| 0.3% Platinum catalyst | 0.42 parts by weight |

Then, this composition was swollen with 45 parts by weight of propylene carbonate in the presence of 12.82 parts by weight of lithium hexafluorophosphate to give ionically conductive gel composition 24. Thus obtained ionically conductive gel composition 24 was charged between an anode of metallic lithium and a cathode of lithium nickelate to form a gel electrolyte layer of 20 μm, whereby a lithium secondary battery was prepared. When this battery was charged at a current value of 0.2 mA, an output of 1.7 mAh/cm² was obtained.

Example 29

Block polymer (C-2) described in Example 23 was mixed with the following compounds as follows and the mixture was gelled in a sealed vessel having a thickness of 2 mm.

| Block polymer (C-2) | 7.41 parts by weight |
|---|---|
| Compound (D-1-3) | 0.165 parts by weight |
| Compound (X-2) | 10 parts by weight |
| Propylene carbonate | 50 parts by weight |
| 0.3% Platinum catalyst | 0.07 parts by weight |

Then, this composition was swollen with 50 parts by weight of propylene carbonate in the presence of 11 parts by weight of lithium hexafluorophosphate to give ionically conductive gel composition 25. This ionically conductive gel composition 25 has an ionic conductivity of $0.5 \times 10^{-3}$ S/cm.

Example 30

The following materials were mixed and the mixture was reacted at 80° C. under a nitrogen atmosphere, after which toluene was removed to synthesize modified polysiloxane compound (G-1).

| Compound (E-1-1) | 117 parts by weight |
|---|---|
| Compound (F-1) | 393.6 parts by weight |
| Toluene | 205 parts by weight |
| 0.3% Platinum catalyst | 0.85 parts by weight |

Then, the synthesized modified polysiloxane compound (G-1) was mixed with the following materials as follows and the mixture was heated to give a gel composition.

| Compound (G-1) | 5.1 parts by weight |
|---|---|
| Compound (D-1-6) | 0.51 parts by weight |
| Ethylene carbonate | 25.8 parts by weight |
| Diethyl carbonate | 18.8 parts by weight |
| 0.3% Platinum catalyst | 0.08 parts by weight |

Then, this composition was swollen with 27 parts by weight of ethylene carbonate and 20 parts by weight of diethyl carbonate in the presence of 11.4 parts by weight of lithium perchlorate to give ionically conductive gel composition 26. This ionically conductive gel composition 26 was charged between a carbon anode and a lithium manganate cathode and sealed to prepare a gel electrolyte layer of 20 μm. When this battery was charged and discharged, it operated as a lithium secondary battery.

Example 31

The following materials were mixed and the mixture was reacted at 80° C. under a nitrogen atmosphere, after which toluene was removed to synthesize modified polysiloxane compound (G-2).

| Compound (E-1-2) | 194.2 parts by weight |
|---|---|
| Compound (F-3) | 39.0 parts by weight |
| Toluene | 233 parts by weight |
| 0.3% Platinum catalyst | 0.39 parts by weight |

Then, the synthesized modified polysiloxane compound (G-2) was mixed with the following materials as follows and the mixture was gelled.

| Compound (G-2) | 23.32 parts by weight |
|---|---|
| Compound (B-1-5) | 1.20 parts by weight |
| Compound (D-1-5) | 4.67 parts by weight |
| Ethylene carbonate | 14.44 parts by weight |
| Diethyl carbonate | 14.44 parts by weight |
| 0.3% Platinum catalyst | 0.6 parts by weight |

Then, this composition was swollen with 14.44 parts by weight of ethylene carbonate and 14.44 parts by weight of diethyl carbonate in the presence of 11.3 parts by weight of lithium trifluoromethanesulfonate to give ionically conductive gel composition 27, which has an ionic conductivity of $0.5 \times 10^{-3}$ S/cm.

Example 32

The following materials were mixed as follows and the mixture was heated at 90° C. for 1 hr to give a gel composition.

| Compound (E-1-1) | 43.5 parts by weight |
|---|---|
| Compound (A-1-1) | 50.2 parts by weight |
| Compound (F-1) | 72.6 parts by weight |
| Compound (D-1-1) | 14.4 parts by weight |
| Compound (X-1) | 12.3 parts by weight |
| Ethylene carbonate | 28 parts by weight |
| Propylene carbonate | 28 parts by weight |
| 0.3% Platinum catalyst | 1.5 parts by weight |

Then, this composition was swollen with 28 parts by weight of ethylene carbonate and 28 parts by weight of propylene carbonate in the presence of 37.6 parts by weight of lithium trifluoromethanesulfonate to give ionically conductive gel composition 28. This ionically conductive gel composition 28 has a storage elastic modulus of $3.2 \times 10^4$ Pa and an ionic conductivity of $0.3 \times 10^{-3}$ S/cm.

A cathode layer and an anode layer were removed from a commercially available lithium secondary battery, and metallic aluminum, the cathode layer, ionically conductive gel composition 28, the anode layer and metallic copper were laminated to prepare a lithium secondary battery. When this battery was charged and discharged at a current value of 0.1 mA, it operated as a secondary battery at a capacity of 1.6 mAh/cm².

Example 33

The following materials were mixed and the mixture was reacted at 80° C. under a nitrogen atmosphere, after which toluene was removed to synthesize linear block copolymer (C-7) having a vinyl group at each end.

| Compound (A-1-4) | 7.87 parts by weight |
|---|---|
| Compound (B-1-2) | 1.44 parts by weight |
| 0.3% Platinum catalyst | 0.02 parts by weight |

The following materials were mixed as follows and the mixture was heated at 90° C. for 1 hr to give a gel composition.

| Block polymer (C-7) | 9.3 parts by weight |
|---|---|
| Compound (E-1-3) | 0.18 parts by weight |
| Propylene carbonate | 25.0 parts by weight |
| Ethylene carbonate | 26.0 parts by weight |
| 0.3% Platinum catalyst | 1.17 parts by weight |

Then, this composition was swollen with 20 parts by weight of ethylene carbonate and 20 parts by weight of propylene carbonate in the presence of 12 parts by weight of lithium hexafluorophosphate to give ionically conductive gel composition 29. This ionically conductive gel composition 29 has a storage elastic modulus of $6 \times 10^4$ Pa and an ionic conductivity of $0.5 \times 10^{-3}$ S/cm.

A cathode layer and an anode layer were removed from a commercially available lithium secondary battery, and metallic aluminum, the cathode layer, ionically conductive gel composition 29, the anode layer and metallic copper were laminated to prepare a lithium secondary battery. When this battery was charged and discharged at a current value of 0.1 mA, the capacity was 1.7 mAh/cm².

Comparative Example 1

To a solution of 60 parts by weight of polymethylhydrogen siloxane (average molecular weight: 300000), 351 parts by weight of polyethylene glycol monoallyl ether and 13.7 parts by weight of tetraethylene glycol diallyl ether dissolved in 4000 parts by weight of toluene was added 80 parts by weight of a solution of chloroplatinic acid in isopropyl alcohol ($3.8 \times 10^{-3}$ mol/l), and the mixture was heated at 50° C. for 48 hrs. Then, toluene was removed under reduced pressure to give a reaction product. A solution of 10% by weight of lithium perchlorate in tetrahydrofuran was prepared and the reaction product was swollen with 40 parts by weight of this solution, after which tetrahydrofuran was removed. The ionic conductivity is determined to be $0.9 \times 10^{-4}$ S/cm at room temperature.

Comparative Example 2

The following compounds were mixed as follows at 100° C.

| Ethylene carbonate | 52.8 parts by weight |
|---|---|
| Diethyl carbonate | 38.8 parts by weight |
| Lithium perchlorate | 8.4 parts by weight |
| Polyvinylidene fluoride (molecular weight: 71000) | 8.9 parts by weight |

Then, a coin battery can (2032) was charged with this mixture at a high temperature and sealed, and then the mixture was gelled by cooling and the conductivity is determined to be $0.95 \times 10^{-3}$ S/cm at room temperature (79% of the conductivity of the electrolyte solution) and $0.05 \times 10^{-3}$ S/cm at −20° C. (15% of the conductivity of the electrolyte solution). The lithium secondary battery prepared by using this gel did not operate well at a temperature of −20° C.

INDUSTRIAL APPLICABILITY OF THE INVENTION

According to the present invention, an ionically conductive composition suitable for use in a battery and the battery containing it can be obtained.

What is claimed is:

1. An ionically conductive composition comprising:

a linear copolymer obtained by polymerizing a compound (A) having two functional groups (a) and a compound (B) having two functional groups (b) via the formation of a bond between said functional groups (a) and (b); and an electrolyte wherein:

said compound (A) is a compound represented by the formula:

(A-1)

wherein $R^{21}$ independently represents a hydrogen atom, a substituted or unsubstituted alkyl group containing 1 to 18 carbon atoms or a substituted or unsubstituted aryl group containing 6 to 20 carbon atoms, $R^{22}$ represents an alkylene group containing 1 to 18 carbon atoms, a substituted or unsubstituted arylene group containing 6 to 20 carbon atoms, an arylalkylene group containing 7 to 21 carbon atoms or a direct bond, and $Z^2$ represents a divalent-group; and said compound (B) is a compound represented by the formula:

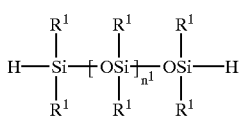

(B-1)

wherein $R^1$ independently represents a substituted or unsubstituted alkyl group containing 1 to 8 carbon atoms, an aralkyl group containing 7 to 21 carbon atoms, or a substituted or unsubstituted aryl group containing 6 to 20 carbon atoms, and $n^1$ represents an integer of 0 to 500; or dimethyl silane.

2. The composition of claim 1, wherein $Z^2$ is a divalent chain derived from a polyoxyalkylene, a polycarbonate or carbonate, a polyester or ester, a polyacrylate, a polymethacrylate or an alkylene.

3. The composition of claim 1 further comprising a modified silicone having a viscosity of 10000 cP or less at 40° C.

4. The composition of claim 1 further comprising a thermoplastic resin in the form of a particle, fiber or porous film.

5. A battery comprising the ionically conductive composition of claim 1.

6. A process for preparing a battery comprising the step of preliminarily coating unpolymerized components of the polymer of claim 1 on a cathode and an anode and polymerizing said components.

7. A process for preparing a battery comprising the step of preliminarily impregnating a substrate with unpolymerized components of the polymer of claim 1, polymerizing said components, and then joining said substrate to a cathode and an anode.

8. A process for preparing a battery comprising the step of charging unpolymerized components of the polymer of claim 1 into an outer shell of a battery and then polymerizing said components.

9. A process for preparing a battery comprising the step of preliminarily impregnating a substrate with unpolymerized components of the polymer of claim 1, joining said substrate to a cathode and an anode, and then polymerizing said components.

10. The composition of claim 1 further comprising a solvent.

11. The composition of claim 10 wherein a solvent is present in a range of 50 to 97% by weight and the storage elastic modulus of the composition is 3000 Pa or more.

12. The composition of claim 10 which has an ionic conductivity of 50% or more of the ionic conductivity for an electrolyte solution consisting of an electrolyte and a solvent at −20° C.

13. An ionically conductive composition comprising:
a polymer obtained by reacting a linear copolymer having two functional groups (b) with a compound (D) having three or more functional groups (a) in the presence or absence of a compound (A) having two functional groups (a) and/or a compound (B) having two functional groups (b), said linear copolymer being obtained by copolymerizing said compounds (A) and (B) via the formation of a bond between said functional groups (a) and (b); and an electrolyte wherein:
said compound (A) is a compound represented by the formula:

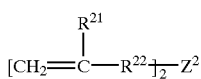

(A-1)

wherein $R^{21}$ independently represents a hydrogen atom, a substituted or unsubstituted alkyl group containing 1 to 18 carbon atoms or a substituted or unsubstituted aryl group containing 6 to 20 carbon atoms, $R^{22}$ represents an alkylene group containing 1 to 18 carbon atoms, a substituted or unsubstituted arylene group containing 6 to 20 carbon atoms, an arylalkylene group containing 7 to 21 carbon atoms or a direct bond, and $Z^2$ represents a divalent group;

said compound (B) is a compound represented by the formula:

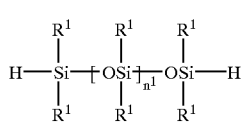

(B-1)

wherein $R^{31}$ independently represents a substituted or unsubstituted alkyl group containing 1 to 18 carbon atoms, an aralkyl group containing 7 to 21 carbon atoms, or a substituted or unsubstituted aryl group containing 6 to 20 carbon atoms, and $n^1$ represents an integer of 0 to 500; or dimethyl silane; and said compound (D) is a compound represented by the formula:

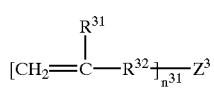

(D-1)

wherein $R^{31}$ independently represents a hydrogen atom, a substituted or unsubstituted alkyl group containing 1 to 18 carbon atoms, or a substituted or unsubstituted aryl group containing 6 to 20 carbon atoms, $R^{32}$ represents an alkylene group containing 1 to 18 carbon atoms, an arylalkylene group containing 7 to 21 carbon atoms, a heteroatom-containing alkylene group containing 1 to 12 carbon atoms and 1 to 6 heteroatoms, or a direct bond, $n^{31}$ represents an integer of 3 or more, and $Z^3$ represents a linking structure having the same valence as $n^{31}$ selected from a carbon atom, a silicon atom, a monosubstituted trivalent silicon atom, an aliphatic group containing 1 to 30 carbon atoms, a heteroatom-containing organic group containing 1 to 30 carbon atoms and 1 to 6 heteroatoms, a benzenepolycarboxy group, a phosphate group, or a straight, branched or cyclic alkyl siloxane group containing 2 to 50 silicon atoms.

14. The composition of claim 13 wherein said compound (D) is reacted with said linear copolymer in the absence of said compounds (A) and (B).

15. The composition of claim 13 wherein said compound (D) is reacted with said linear copolymer in the presence of said compound (A).

16. The composition of claim 13 wherein said compound (D) is reacted with said linear copolymer in the presence of said compound (B).

17. The composition of claim 13 wherein said compound (D) is reacted with said linear copolymer in the presence of said compounds (A) and (B).

18. The composition of claim 13, wherein $Z^2$ is a divalent chain derived-t from a polyoxyalkylene, a polycarbonate or carbonate, a polyester or ester, a polyacrylate, a polymethacrylate or an alkylene.

19. An ionically conductive composition comprising: a polymer obtained by simultaneously reacting a compound represented by the formula:

(A-1)

wherein $R^{21}$ independently represents a hydrogen atom, a substituted or unsubstituted alkyl group containing 1 to 18 carbon atoms or a substituted or unsubstituted aryl group containing 6 to 20 carbon atoms, $R^{22}$ represents an alkylene group containing 1 to 18 carbon atoms, a substituted or unsubstituted arylene group containing 6 to 20 carbon atoms, an arylalkylene group containing 7 to 21 carbon atoms or a direct bond, and $Z^2$ represents a divalent group; a compound represented by the formula:

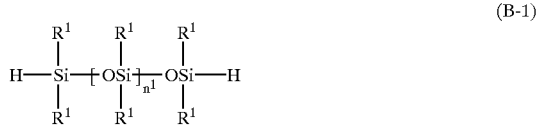

(B-1)

wherein $R^1$ independently represents a substituted or unsubstituted alkyl group containing 1 to 18 carbon atoms, an aralkyl group containing 7 to 21 carbon atoms, or a substituted or unsubstituted aryl group containing 6 to 20 carbon atoms, and $n^1$ represents an integer of 0 to 500 or dimethyl silane, and a compound represented by the formula:

(D-1)

wherein $R^{31}$ independently represents a hydrogen atom, a substituted or unsubstituted alkyl group containing 1 to 18 carbon atoms, or a substituted or unsubstituted aryl group containing 6 to 20 carbon atoms, $R^{32}$ represents an alkylene group containing 1 to 18 carbon atoms, an arylalkylene group containing 7 to 21 carbon atoms, a heteroatom-containing alkylene group containing 1 to 12 carbon atoms and 1 to 6 heteroatoms, or a direct bond, $n^{31}$ represents an integer of 3 or more, and $Z^3$ represents a linking structure having the same valence as $n^{31}$ selected from a carbon atom, a silicon atom, a monosubstituted trivalent silicon atom, an aliphatic group containing 1 to 30 carbon atoms, a heteroatom-containing organic group containing 1 to 30 carbon atoms and 1 to 6 heteroatoms, a benzenepolycarboxy group, a phosphate group, or a straight, branched or cyclic alkyl siloxane group containing 2 to 50 silicon atoms; and
an electrolyte.

20. The composition of claim 19 wherein $Z^2$ is a divalent chain derived from a polyoxyalkylene, a polycarbonate or carbonate, a polyester or ester, a polyacrylate, a polymethacrylate or an alkylene.

21. An ionically conductive composition comprising:
a polymer obtained by reacting a linear copolymer having two functional groups (a) with a compound (E) having three or more functional group (b) in the presence or absence of a compound (A) having two functional groups (a) and/or a compound (B) having two functional groups (b),
said linear copolymer being obtained by polymerizing said compounds (A) and (B) via the formation of a bond between
said functional groups (a) and (b); and
an electrolyte
wherein:
said compound (A) is a compound represented by the formula:

(A-1)

wherein $R^{21}$ independently represents a hydrogen atom, a substituted or unsubstituted alkyl group containing 1 to 18 carbon atoms or a substituted or unsubstituted aryl group containing 6 to 20 carbon atoms, $R^{22}$ represents an alkylene group containing 1 to 18 carbon atoms, a substituted or unsubstituted arylene group containing 6 to 20 carbon atoms, an arylalkylene group containing 7 to 21 carbon atoms or a direct bond, and $Z^2$ represents a divalent group;
said compound (B) is a compound represented by the formula:

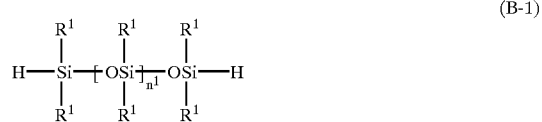

(B-1)

wherein $R^1$ independently represents a substituted or unsubstituted alkyl group containing 1 to 18 carbon atoms, an aralkyl group containing 7 to 21 carbon atoms, or a substituted or unsubstituted aryl group containing 6 to 20 carbon atoms, and $n^1$ represents an integer of 0 to 500; or dimethyl silane; and
said compound (E) is a compound represented by the formula:

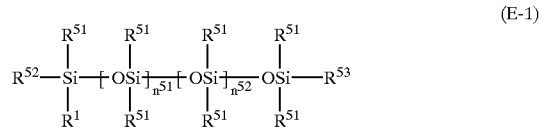

(E-1)

wherein $R^{51}$ independently represents a substituted or unsubstituted alkyl group containing 1 to 18 carbon atoms, an aralkyl group containing 7 to 21 carbon atoms, or a substituted or unsubstituted aryl group containing 6 to 20 carbon atoms, $R^{52}$ and $R^{53}$ independently represent a hydrogen group, a substituted or unsubstituted alkyl group containing 1 to 18 carbon atoms, an aralkyl group containing 7 to 21 carbon atoms, or a substituted or unsubstituted aryl group containing 6 to 20 carbon atoms, or $R^{52}$ and $R^{53}$ may be combined to form —O—, and $n^{51}$ and $n^{52}$ represent an integer of 0 or 1 or more with $n^{51}+n^{52}$ being 1 to 500, provided that the total number of hydrogen atoms directly bonded to silicon atoms including the hydrogen atoms eventually represented by $R^{52}$ and/or $R^{53}$ is 3 or more.

22. The composition of claim 21 wherein $Z^2$ is a divalent chain derived from a polyoxyalkylene, a polycarbonate or carbonate, a polyester or ester, a polyacrylate, a polymethacrylate or an alkylene.

23. An ionically conductive composition comprising:
a polymer obtained by reacting a compound represented by the formula:

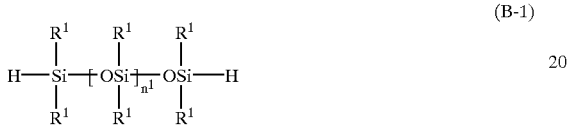

(B-1)

wherein $R^1$ independently represents a substituted or unsubstituted alkyl group containing 1 to 18 carbon atoms, an aralkyl group containing 7 to 21 carbon atoms, or a substituted or unsubstituted aryl group containing 6 to 20 carbon atoms, and $n^1$ represents an integer of 0 to 500, the modified polysiloxane compound having two or more hydrosilyl groups and a compound represented by the formula:

(D-1)

wherein $R^{31}$ independently represents a hydrogen atom, a substituted or unsubstituted alkyl group containing 1 to 18 carbon atoms, or a substituted or unsubstituted aryl group containing 6 to 20 carbon atoms, $R^{32}$ represents an alkylene group containing 1 to 18 carbon atoms, an arylalkylene group containing 7 to 21 carbon atoms, a heteroatom-containing alkylene group containing 1 to 12 carbon atoms and 1 to 6 heteroatoms, or a direct bond, $n^{31}$ represents an integer of 3 or more, and $Z^3$ represents a linking structure having the same valence as $n^{31}$ selected from a carbon atom, a silicon atom, a monosubstituted trivalent silicon atom, an aliphatic group containing 1 to 30 carbon atoms, a heteroatom-containing organic group containing 1 to 30 carbon atoms and 1 to 6 heteroatoms, a benzenepolycarboxy group, a phosphate group, or a straight, branched or cyclic alkyl siloxane group containing 2 to 50 silicon atoms; and
an electrolyte.

24. The composition of claim 23 wherein $A^2$ is a divalent chain derived from a polyoxyalkylene, a polycarbonate or carbonate, a polyester or ester, a polyacrylate, a polymethacrylate or an alkylene.

25. An ionically conductive composition comprising:
a polymer obtained by reacting a linear copolymer having two functional groups (b), a modified polysiloxane compound having two or more hydrosilyl groups, and a compound represented by the formula:

(D-1)

wherein $R^{31}$ independently represents a hydrogen atom, a substituted or unsubstituted alkyl group containing 1 to 18 carbon atoms, or a substituted or unsubstituted aryl group containing 6 to 20 carbon atoms, $R^{32}$ represents an alkylene group containing 1 to 18 carbon atoms, an arylalkylene group containing 7 to 21 carbon atoms, a heteroatom-containing alkylene group containing 1 to 12 carbon atoms and 1 to 6 heteroatoms, or a direct bond, $n^{31}$ represents an integer of 3 or more, and $Z^3$ represents a linking structure having the same valence as $n^{31}$ selected from a carbon atom, a silicon atom, a monosubstituted trivalent silicon atom, an aliphatic group containing 1 to 30 carbon atoms, a heteroatom-containing organic group containing 1 to 30 carbon atoms and 1 to 6 heteroatoms, a benzenepolycarboxy group, a phosphate group, or a straight, branched or cyclic alkyl siloxane group containing 2 to 50 silicon atoms; and
an electrolyte.

26. The composition of claim 25 wherein $A^2$ is a divalent chain derived from a polyoxyalkylene, a polycarbonate or carbonate, a polyester or ester, a polyacrylate, a polymethacrylate or an alkylene.

27. A gel composition comprising:
a crosslinked copolymer obtained by reacting a linear copolymer, which is formed by copolymerizing a compound represented by the formula:

(A-1)

wherein $R^{21}$ independently represents a hydrogen atom, a substituted or unsubstituted alkyl group containing 1 to 18 carbon atoms or a substituted or unsubstituted aryl group containing 6 to 20 carbon atoms, $R^{22}$ represents an alkylene group containing 1 to 18 carbon atoms, a substituted or unsubstituted arylene group containing 6 to 20 carbon atoms, an arylalkylene group containing 7 to 21 carbon atoms or a direct bond, and $Z^2$ represents a divalent group; and a compound represented by the formula:

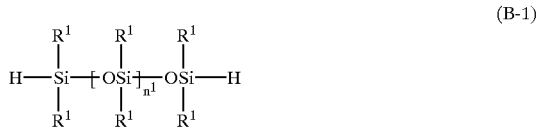

(B-1)

wherein $R^1$ independently represents a substituted or unsubstituted alkyl group containing 1 to 18 carbon atoms, an aralkyl group containing 7 to 21 carbon atoms, or a substituted or unsubstituted aryl group containing 6 to 20 carbon atoms, and $n^1$ represents an integer of 0 to 500; or dimethyl silane, with a compound represented by the formula:

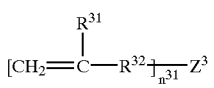
(D-1)

wherein $R^{31}$ independently represents a hydrogen atom, a substituted or unsubstituted alkyl group containing 1 to 18 carbon atoms, or a substituted or unsubstituted aryl group containing 6 to 20 carbon atoms, $R^{32}$ represents an alkylene group containing 1 to 18 carbon atoms, an arylalkylene group containing 7 to 21 carbon atoms, a heteroatom-containing alkylene group containing 1 to 12 carbon atoms and 1 to 6 heteroatoms, or a direct bond, $n^{31}$ represents an integer of 3 or more, and $Z^3$ represents a linking structure having the same valence as $n^{31}$ selected from a carbon atom, a silicon atom, a monosubstituted trivalent silicon atom, an aliphatic group containing 1 to 30 carbon atoms, a heteroatom-containing organic group containing 1 to 30 carbon atoms and 1 to 6 heteroatoms, a benzenepolycarboxy group, a phosphate group, or a straight, branched or cyclic alkyl siloxane group containing 2 to 50 silicon atoms; and a solvent.

28. The gel composition of claim 27, wherein said compounds of formula (A-1), formula (B-1) or dimethyl silane and formula (D-1) are simultaneously reacted in a solvent.

29. A gel composition comprising: a crosslinked copolymer obtained by reacting a linear copolymer, which is formed by copolymerizing a compound represented by the formula:

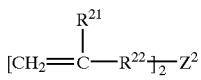
(A-1)

wherein $R^{31}$ independently represents a hydrogen atom, a substituted or unsubstituted alkyl group containing 1 to 18 carbon atoms or a substituted or unsubstituted aryl group containing 6 to 20 carbon atoms, $R^{22}$ represents an alkylene group containing 1 to 18 carbon atoms, a substituted or unsubstituted arylene group containing 6 to 20 carbon atoms, an arylalkylene group containing 7 to 21 carbon atoms or a direct bond, and $Z^2$ represents a divalent group; and a compound represented by the formula:

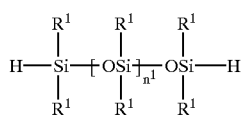
(B-1)

wherein $R^1$ independently represents a substituted or unsubstituted alkyl group containing 1 to 18 carbon atoms, an aralkyl group containing 7 to 21 carbon atoms, or a substituted or unsubstituted aryl group containing 6 to 20 carbon atoms, and $n^1$ represents an integer of 0 to 500; or dimethyl silane, with a compound represented by the formula:

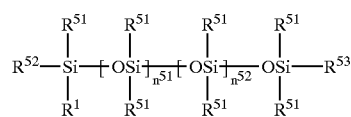
(E-1)

wherein $R^{51}$ independently represents a substituted or unsubstituted alkyl group containing 1 to 18 carbon atoms, an aralkyl group containing 7 to 21 carbon atoms, or a substituted or unsubstituted aryl group containing 6 to 20 carbon atoms, $R^{52}$ and $R^{53}$ independently represent a hydrogen group, a substituted or unsubstituted alkyl group containing 1 to 18 carbon atoms, an aralkyl group containing 7 to 21 carbon atoms, or a substituted or unsubstituted aryl group containing 6 to 20 carbon atoms, or $R^{52}$ and $R^{53}$ may be combined to form —O—, and $n^{51}$ and $n^{52}$ represent an integer of 0 or 1 or more with $n^{51}+n^{52}$ being 1 to 500, provided that the total number of hydrogen atoms directly bonded to silicon atoms including the hydrogen atoms eventually represented by $R^{52}$ and/or $R^{53}$ is 3 or more; and a solvent.

30. A gel composition comprising: a crosslinked copolymer obtained by reacting a compound represented by the formula:

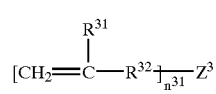
(D-1)

wherein $R^{31}$ independently represents a hydrogen atom, a substituted or unsubstituted alkyl group containing 1 to 18 carbon atoms, or a substituted or unsubstituted aryl group containing 6 to 20 carbon atoms, $R^{32}$ represents an alkylene group containing 1 to 18 carbon atoms, an arylalkylene group containing 7 to 21 carbon atoms, a heteroatom-containing alkylene group containing 1 to 12 carbon atoms and 1 to 6 heteroatoms, or a direct bond, $n^{31}$ represents an integer of 3 or more, and $Z^3$ represents a linking structure having the same valence as $n^{31}$ selected from a carbon atom, a silicon atom, a monosubstituted trivalent silicon atom, an aliphatic group containing 1 to 30 carbon atoms, a heteroatom-containing organic group containing 1 to 30 carbon atoms and 1 to 6 heteroatoms, a benzenepolycarboxy group, a phosphate group, or a straight, branched or cyclic alkyl siloxane group containing 2 to 50 silicon atoms, a compound represented by the formula:

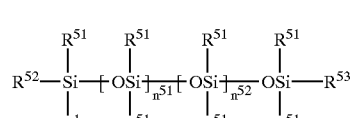
(E-1)

wherein $R^{51}$ independently represents a substituted or unsubstituted alkyl group containing 1 to 18 carbon atoms, an aralkyl group containing 7 to 21 carbon atoms, or a substituted or unsubstituted aryl group containing 6 to 20 carbon atoms, $R^{52}$ and $R^{53}$ independently represent a hydrogen group, a substituted or unsubstituted alkyl group containing 1 to 18 carbon atoms, an aralkyl group containing 7 to 21 carbon atoms, or a substituted or unsubstituted aryl group containing 6 to 20 carbon atoms, or $R^{52}$ and $R^{53}$ may be combined to form —O—, and $n^{51}$ and $n^{52}$ represent an integer of 0 or 1 or more with $n^{51}+n^{52}$ being 1 to 500, provided that the total number of hydrogen atoms directly bonded to silicon atoms including the hydrogen atoms eventually represented by $R^{52}$ and/or $R^{53}$ is 3 or more and a compound represented by the formula:

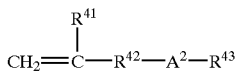

(F)

wherein $R^{41}$ independently represents a hydrogen atom, a substituted or unsubstituted alkyl group containing 1 to 18 carbon atoms, or a substituted or unsubstituted aryl group containing 6 to 20 carbon atoms, $R^{42}$ represents an alkylene group containing 1 to 18 carbon atoms, a substituted or unsubstituted arylene group containing 6 to 20 carbon atoms, an arylalkylene group containing 7 to 21 carbon atoms, or a direct bond, $R^{43}$ represents a hydrogen atom, a substituted or unsubstituted alkyl group containing 1 to 18 carbon atoms, or a substituted or unsubstituted aryl group containing 6 to 20 carbon atoms, and $A^2$ represents a divalent group; and a solvent.

31. A gel composition comprising:

a crosslinked copolymer obtained by reacting a compound of formula (A-1)

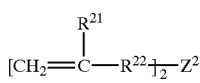

(A-1)

wherein $R^{21}$ independently represents a hydrogen atom, a substituted or unsubstituted alkyl group containing 1 to 18 carbon atoms or a substituted or unsubstituted aryl group containing 6 to 20 carbon atoms, $R^{22}$ represents an alkylene group containing 1 to 18 carbon atoms, a substituted or unsubstituted arylene group containing 6 to 20 carbon atoms, an arylalkylene group containing 7 to 21 carbon atoms or a direct bond, and $Z^2$ represents a divalent group; a modified polysiloxane compound having two or more hydrosilyl groups obtained by preliminarily reacting a compound of formula (E-1) with a compound of formula (F)

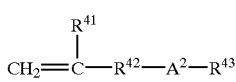

(F)

wherein $R^{41}$ independently represents a hydrogen atom, a substituted or unsubstituted alkyl group containing 1 to 18 carbon atoms, or a substituted or unsubstituted aryl group containing 6 to 20 carbon atoms, $R^{42}$ represents an alkylene group containing 1 to 18 carbon atoms, a substituted or unsubstituted arylene group containing 6 to 20 carbon atoms, an arylalkylene group containing 7 to 21 carbon atoms, or a direct bond, $R^{43}$ represents a hydrogen atom, a substituted or unsubstituted alkyl group containing 1 to 18 carbon atoms, or a substituted or unsubstituted aryl group containing 6 to 20 carbon atoms, and $A^2$ represents a divalent group; and a compound of formula (D-1)

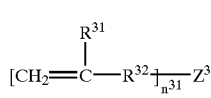

(D-1)

wherein $R^{31}$ independently represents a hydrogen atom, a substituted or unsubstituted alkyl group containing 1 to 18 carbon atoms, or a substituted or unsubstituted aryl group containing 6 to 20 carbon atoms, $R^{32}$ represents an alkylene group containing 1 to 18 carbon atoms, an arylalkylene group containing 7 to 21 carbon atoms, a heteroatom-containing alkylene group containing 1 to 12 carbon atoms and 1 to 6 heteroatoms, or a direct bond, $n^{31}$ represents an integer of 3 or more, and $Z^3$ represents a linking structure having the same valence as $n^{31}$ selected from a carbon atom, a silicon atom, a monosubstituted trivalent silicon atom, an aliphatic group containing 1 to 30 carbon atoms, a heteroatom-containing organic group containing 1 to 30 carbon atoms and 1 to 6 heteroatoms, a benzenepolycarboxy group, a phosphate group, or a straight, branched or cyclic alkyl siloxane group containing 2 to 50 silicon atoms; and a solvent.

32. A gel composition comprising:

a crosslinked copolymer obtained by reacting a compound of formula (B-1)

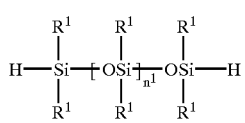

(B-1)

wherein $R^1$ independently represents a substituted or unsubstituted alkyl group containing 1 to 18 carbon atoms, an aralkyl group containing 7 to 21 carbon atoms, or a substituted or unsubstituted aryl group containing 6 to 20 carbon atoms, and $n^1$ represents an integer of 0 to 500;

a modified polysiloxane compound having two or more hydrosilyl groups obtained by preliminarily reacting a compound of formula (E-1)

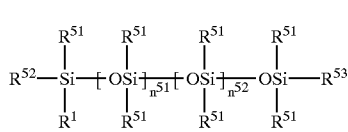

(E-1)

wherein $R^{51}$ independently represents a substituted or unsubstituted alkyl group containing 1 to 18 carbon atoms, an aralkyl group containing 7 to 21 carbon atoms, or a substituted or unsubstituted aryl group containing 6 to 20 carbon atoms, $R^{52}$ and $R^{53}$ independently represent a hydrogen group, a substituted or unsubstituted alkyl group containing 1 to 18 carbon atoms, an aralkyl group containing 7 to 21 carbon atoms, or a substituted or unsubstituted aryl group containing 6 to 20 carbon atoms, or $R^{52}$ and $R^{53}$ may be combined to form —O—, and $n^{51}$ and $n^{52}$ represent an integer of 0 or 1 or more with $n^{51}+n^{52}$ being 1 to 500, provided that the total number of hydrogen atoms directly bonded to silicon atoms including the hydrogen atoms eventually represented by $R^{52}$ and/or $R^{53}$ is 3 or more; with a compound of formula (F)

(F)

wherein $R^{41}$ independently represents a hydrogen atom, a substituted or unsubstituted alkyl group containing 1 to 18 carbon atoms, or a substituted or unsubstituted aryl group containing 6 to 20 carbon atoms, $R^{42}$ represents an alkylene group containing 1 to 18 carbon atoms, a substituted or unsubstituted arylene group containing 6 to 20 carbon atoms, an arylalkylene group containing 7 to 21 carbon atoms, or a direct bond, $R^{43}$ represents a hydrogen atom, a substituted or unsubstituted alkyl group containing 1 to 18 carbon atoms, or a substituted or unsubstituted aryl group containing 6 to 20 carbon atoms, and $A^2$ represents a divalent group; and a compound of formula (D-1)

(D-1)

wherein $R^{31}$ independently represents a hydrogen atom, a substituted or unsubstituted alkyl group containing 1 to 18 carbon atoms, or a substituted or unsubstituted aryl group containing 6 to 20 carbon atoms, $R^{32}$ represents an alkylene group containing 1 to 18 carbon atoms, an arylalkylene group containing 7 to 21 carbon atoms, a heteroatom-containing alkylene group containing 1 to 12 carbon atoms and 1 to 6 heteroatoms, or a direct bond, $n^{31}$ represents an integer of 3 or more, and $Z^3$ represents a linking structure having the same valence as $n^{31}$ selected from a carbon atom, a silicon atom, a monosubstituted trivalent silicon atom, an aliphatic group containing 1 to 30 carbon atoms, a heteroatom-containing organic group containing 1 to 30 carbon atoms and 1 to 6 heteroatoms, a benzene-polycarboxy group, a phosphate group, or a straight, branched or cyclic alkyl siloxane group containing 2 to 50 silicon atoms; and a solvent.

* * * * *